(12) United States Patent
Iwase et al.

(10) Patent No.: US 11,445,116 B2
(45) Date of Patent: Sep. 13, 2022

(54) IMAGING APPARATUS AND DISPLAY CONTROL METHOD

(71) Applicant: SONY CORPORATION, Tokyo (JP)

(72) Inventors: Ayako Iwase, Kanagawa (JP); Shinji Kuriyama, Tokyo (JP); Daisuke Yamamoto, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/981,779

(22) PCT Filed: Dec. 27, 2018

(86) PCT No.: PCT/JP2018/048161
§ 371 (c)(1),
(2) Date: Sep. 17, 2020

(87) PCT Pub. No.: WO2019/187447
PCT Pub. Date: Oct. 3, 2019

(65) Prior Publication Data
US 2021/0120188 A1  Apr. 22, 2021

(30) Foreign Application Priority Data
Mar. 26, 2018  (JP) .............................. JP2018-058140

(51) Int. Cl.
*H04N 5/232* (2006.01)
*G06F 3/0482* (2013.01)

(52) U.S. Cl.
CPC ... *H04N 5/232933* (2018.08); *H04N 5/23245* (2013.01); *G06F 3/0482* (2013.01)

(58) Field of Classification Search
CPC .......... H04N 5/232933; H04N 5/23245; G06F 3/0482; G03B 17/02; G03B 17/18
See application file for complete search history.

(56) References Cited

FOREIGN PATENT DOCUMENTS

| JP | 2006-074321 A | | 3/2006 |
|---|---|---|---|
| JP | 2006074321 A | * | 3/2006 |
| JP | 2016-032214 A | | 3/2016 |
| JP | 2018-011199 A | | 1/2018 |
| JP | 2018-182600 A | | 11/2018 |

OTHER PUBLICATIONS

International Search Report and Written Opinion of PCT Application No. PCT/JP2018/048161, dated Apr. 9, 2019, 07 pages of ISRWO.

* cited by examiner

*Primary Examiner* — Yogesh K Aggarwal
(74) *Attorney, Agent, or Firm* — Chip Law Group

(57) ABSTRACT

To perform appropriate display control, for example, according to automatic switching of a setting value of a setting item between a still image imaging mode and a moving image imaging mode during use of an imaging apparatus. Therefore, a display control unit is included that controls a display mode of a setting operation screen depending on whether a setting item related to imaging in a plurality of imaging modes is set to common setting for the plurality of imaging modes or independent setting for each imaging mode. In a case where the setting item is common setting, the display control unit performs control to display a setting operation screen common to the plurality of imaging modes, and in a case where the setting item is independent setting, the display control unit performs control to display different setting operation screens for each imaging mode.

16 Claims, 16 Drawing Sheets

CAMERA TAB 50

CAMERA TAB 60

MOVING IMAGE TAB 70

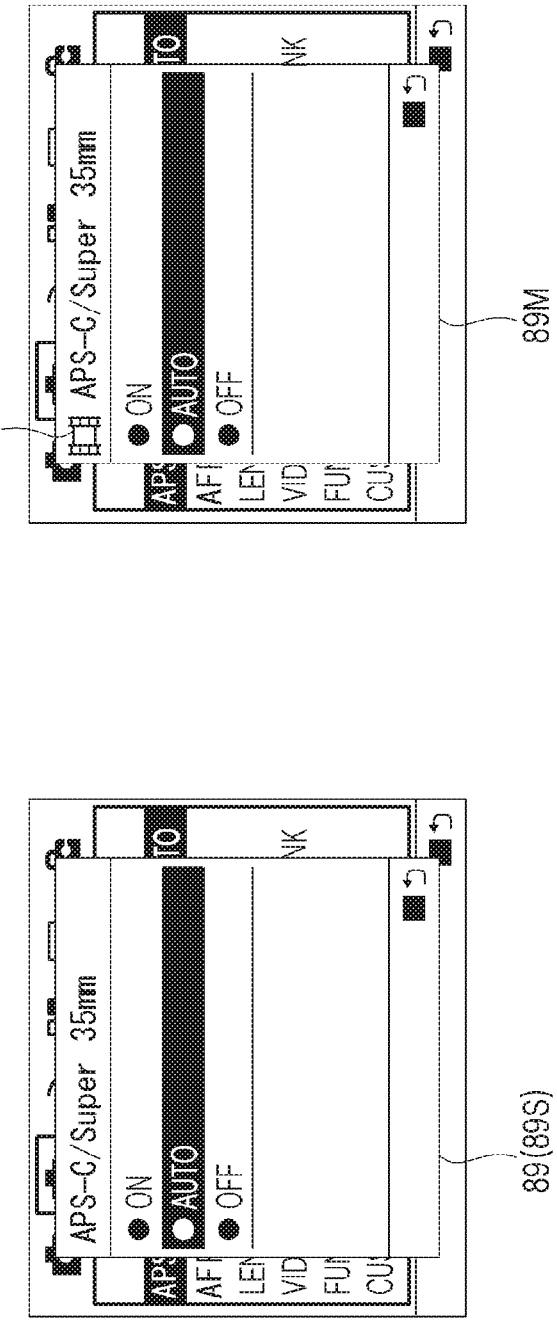

IMAGING APPARATUS AND DISPLAY CONTROL METHOD

CROSS REFERENCE TO RELATED APPLICATIONS

This application is a U.S. National Phase of International Patent Application No. PCT/JP2018/048161 filed on Dec. 27, 2018, which claims priority benefit of Japanese Patent Application No. JP 2018-058140 filed in the Japan Patent Office on Mar. 26, 2018. Each of the above-referenced applications is hereby incorporated herein by reference in its entirety.

TECHNICAL FIELD

The present technology relates to an imaging apparatus, a display control method, and a program, and particularly to a technology for operating various setting items related to imaging.

BACKGROUND ART

Imaging apparatuses that can switch between a plurality of imaging modes, such as a still image imaging mode and a moving image imaging mode, and execute an imaging mode have been widely used. A user who uses such an imaging apparatus can change various settings depending on an imaging mode.

Patent Document 1 below describes setting conditions suitable for a plurality of imaging modes.

CITATION LIST

Patent Document

Patent Document 1: Japanese Patent Application Laid-Open No. 2016-32214

SUMMARY OF THE INVENTION

Problems to be Solved by the Invention

The present technology provides an appropriate user interface so as to be able to adapt to various usage opportunities and usage modes of a user and eliminate the trouble of changing settings for each imaging mode.

Solutions to Problems

An imaging apparatus according to the present technology includes a display control unit that controls a display mode of a setting operation screen that performs an operation of a setting item depending on whether a setting item related to imaging is common setting that is commonly controlled for a plurality of imaging modes or the setting item is independent setting that is independently controlled for each imaging mode, in which the display control unit, in a case where the setting item is the common setting, regardless of the imaging mode, performs control to display the setting operation screen common to the plurality of imaging modes, and in a case where the setting item is the independent setting, performs control to display a different setting operation screen depending on the imaging mode.

That is, for various setting items of the imaging apparatus, common setting and independent setting can be switched in a plurality of imaging modes. In that case, in the case of common setting, the display mode of the setting operation screen is not changed depending on the imaging mode. On the other hand, in the case of independent setting, the display mode of the setting operation screen is changed depending on the imaging mode.

In the imaging apparatus according to the present technology described above, the display control unit may perform control to display a selection operation screen on which each setting item can be selected to be the common setting or the independent setting.

The setting items that commonly exist in the plurality of imaging modes may be common setting or independent setting. Therefore, these items are displayed, for example, as a list display so that the user can select common setting and independent setting for each item.

In the imaging apparatus according to the present technology described above, the display control unit may perform control to perform display indicating the common setting or the independent setting on a setting menu screen that displays the setting item.

On the screen where various setting items are displayed on the menu, common setting/independent setting can be distinguished by clearly indicating, for example, the setting item of the independent setting.

In the imaging apparatus according to the present technology described above, the display control unit may perform control to perform display of distinguishing a corresponding imaging mode in a case where at least the setting operation screen of the setting item of the independent setting is displayed.

For example, on the setting operation screen of the setting item of the independent setting in the first and second imaging modes, for example, in the case of corresponding to the first imaging mode, an icon indicating the first imaging mode, and in the case of corresponding to the second imaging mode, an icon or the like indicating the second imaging mode are displayed so that the corresponding imaging mode can be distinguished. Alternatively, in the case of two imaging modes, it is only required to be able to identify at least one (for example, the second imaging mode). Therefore, even when an icon or the like indicating the second imaging mode is displayed only in the case of corresponding to the second imaging mode, it is possible to distinguish between the first imaging mode and the second imaging mode.

In the imaging apparatus according to the present technology described above, the display control unit, in a case where an operation related to the setting item is performed while a screen generated by imaging is displayed, may perform control to provide a display mode in which display of the screen generated by imaging is different depending on whether the target setting item is the common setting or the independent setting.

The setting operation screen of the setting item can be called by various operations from the state in which the screen (live view) generated by imaging is displayed. In this case, the display mode is changed depending on whether the designated setting item is common setting or independent setting.

In the imaging apparatus according to the present technology described above, the display control unit, regarding the setting item of the independent setting, may perform control of providing a display mode in which the setting operation screen is different between a case where an operation for giving an instruction on a setting operation of one imaging mode for the setting item is performed in the one imaging mode and a case where an operation for giving an instruction on a setting operation of one imaging mode for the setting item is performed in another imaging mode.

Regarding the setting item of the independent setting, the setting can be changed not only in the imaging mode of the imaging apparatus at that time, but also in a specific imaging mode. That is, the setting relating to one imaging mode of a certain setting item can be changed not only at the point of time of the one imaging mode but also at the point of time of another imaging mode. In this case, the display mode of the setting operation screen is made different depending on which point of time of imaging mode.

In the imaging apparatus according to the present technology described above, the display control unit may at least display, as a setting menu screen, a first tab including a setting item corresponding to a first imaging mode, and a second tab including a setting item corresponding to a second imaging mode.

That is, the setting item corresponding to the first imaging mode and the setting item corresponding to the second imaging mode are displayed on different tabs.

In the imaging apparatus according to the present technology described above, the display control unit, in a case where an instruction on an operation of the setting item included in both the first tab and the second tab is given, in a case where the setting item is the common setting, regardless of the imaging mode, may perform control such that a setting operation screen common to the plurality of imaging modes is displayed, and in a case where the setting item is the independent setting, perform control such that a different setting operation screen is displayed depending on the imaging mode.

The setting item corresponding to the first imaging mode and the setting item corresponding to the second imaging mode, which are the same setting item, are included on different tables. In a case where the selected setting item is common setting, the screen transitions to the same setting operation screen regardless of on which tab the setting item is selected.

In a case where the selected setting item is independent setting, the screen transitions to the setting operation screen according to the first imaging mode in a case where the setting item of the first tab is selected, and the screen transitions to the setting operation screen according to the second imaging mode in a case where the setting item of the second tab is selected.

In the imaging apparatus according to the present technology described above, the display control unit, regarding the setting item at least included in both the first tab and the second tab, the setting item being the independent setting, may perform display for distinguishing that the setting item of the first tab and the setting item of the second tab correspond to the first imaging mode and the second imaging mode.

For example, a common setting item in each tab can be distinguished by presenting an icon indicating the imaging mode for the setting item on either or both of the first tab and the second tab.

In the imaging apparatus according to the present technology described above, the display control unit, regarding the setting item at least included in both the first tab and the second tab, the setting item being the independent setting, may perform control of providing different display modes in a case where the setting item of the second tab is specified in the first imaging mode and in a case where the setting item of the second tab is specified in the second imaging mode.

Regarding the setting item of the independent setting, by being included in the plurality of tabs, the setting can be changed not only in the imaging mode of the imaging apparatus at that time, but also in a specific imaging mode. Therefore, the display mode of the setting operation screen is changed depending on which point of time of imaging mode.

In the imaging apparatus according to the present technology described above, the plurality of imaging modes may include a still image imaging mode and a moving image imaging mode.

That is, for various setting items, common setting and independent setting can be switched in the still image imaging mode and the moving image imaging mode.

In the imaging apparatus according to the present technology described above, as the setting item that can be selected to be the common setting and the independent setting, a setting item that affects a captured image acquired by imaging may be included.

For example, the setting item that affects a captured image includes setting items such as white balance, shutter speed, and ISO sensitivity.

In the imaging apparatus according to the present technology described above, as the setting item that can be selected to be the common setting and the independent setting, a setting item that affects display of a screen generated by imaging may be included.

For example, the setting item that affects the display of a captured image includes zebra setting, peaking level and color setting, and the like.

In the imaging apparatus according to the present technology described above, as the setting item that can be selected to be the common setting and the independent setting, a setting item related to an imaging operation may be included.

For example, the setting item related to the imaging operation includes a function menu setting, a key assignment setting of a custom key, and the like.

Another imaging apparatus according to the present technology includes a setting management unit that can selectively execute whether to store a setting item related to imaging as common setting that is commonly controlled for a plurality of imaging modes or to store the setting item related to imaging as independent setting that is independently controlled for each imaging mode, in which the setting management unit, in a case where the setting item of an operation target is selected to be the common setting, updates memory of a setting value common to the plurality of imaging modes according to a setting change operation, and in a case where the setting item of the operation target is selected to be the independent setting, updates memory of a setting value of an imaging mode of the operation target according to a setting change operation of the imaging mode of the operation target.

For example, common setting is set in the initial state, and the memory of setting information does not particularly correspond to the imaging mode. In response to the independent setting, the setting information is stored as information corresponding to the imaging mode.

A display control method of an imaging apparatus according to the present technology includes, regarding a setting item of common setting that is commonly controlled for a plurality of imaging modes among setting items related to imaging, controlling a display mode of a setting operation screen that performs an operation of a setting item such that a setting operation screen common to the plurality of imaging modes is displayed regardless of the imaging mode; and regarding a setting item of independent setting that is independently controlled for each imaging mode among the setting items related to imaging, controlling a display mode of the setting operation screen such that a different setting operation screen is displayed according to the imaging mode.

As a result, the display according to common setting/ independent setting is performed, and the ease of understanding for the user and the operability are improved.

The program according to the present technology is a program that causes an information processing apparatus to execute the control processing of the display control method.

Effects of the Invention

According to the present technology, it is possible to eliminate the trouble of setting change for a user who uses an imaging apparatus by switching an imaging mode and to provide its setting operation in an easy-to-understand manner.

Note that effects described herein are not necessarily limited, but may also be any of those described in the present disclosure.

BRIEF DESCRIPTION OF DRAWINGS

FIGS. 11A and 11B are explanatory diagrams of a radio button screen according to an embodiment.

MODE FOR CARRYING OUT THE INVENTION

An embodiment will be described below in the following order.

<1. Imaging apparatus and peripheral apparatuses>
<2. Configuration of the imaging apparatus>
<3. Setting screen>
<4. Example of processing of the control unit>
<5. Application to program and computer apparatus>
<6. Summary and variation>

<1. Imaging Apparatus and Peripheral Apparatuses>

Figure 1:
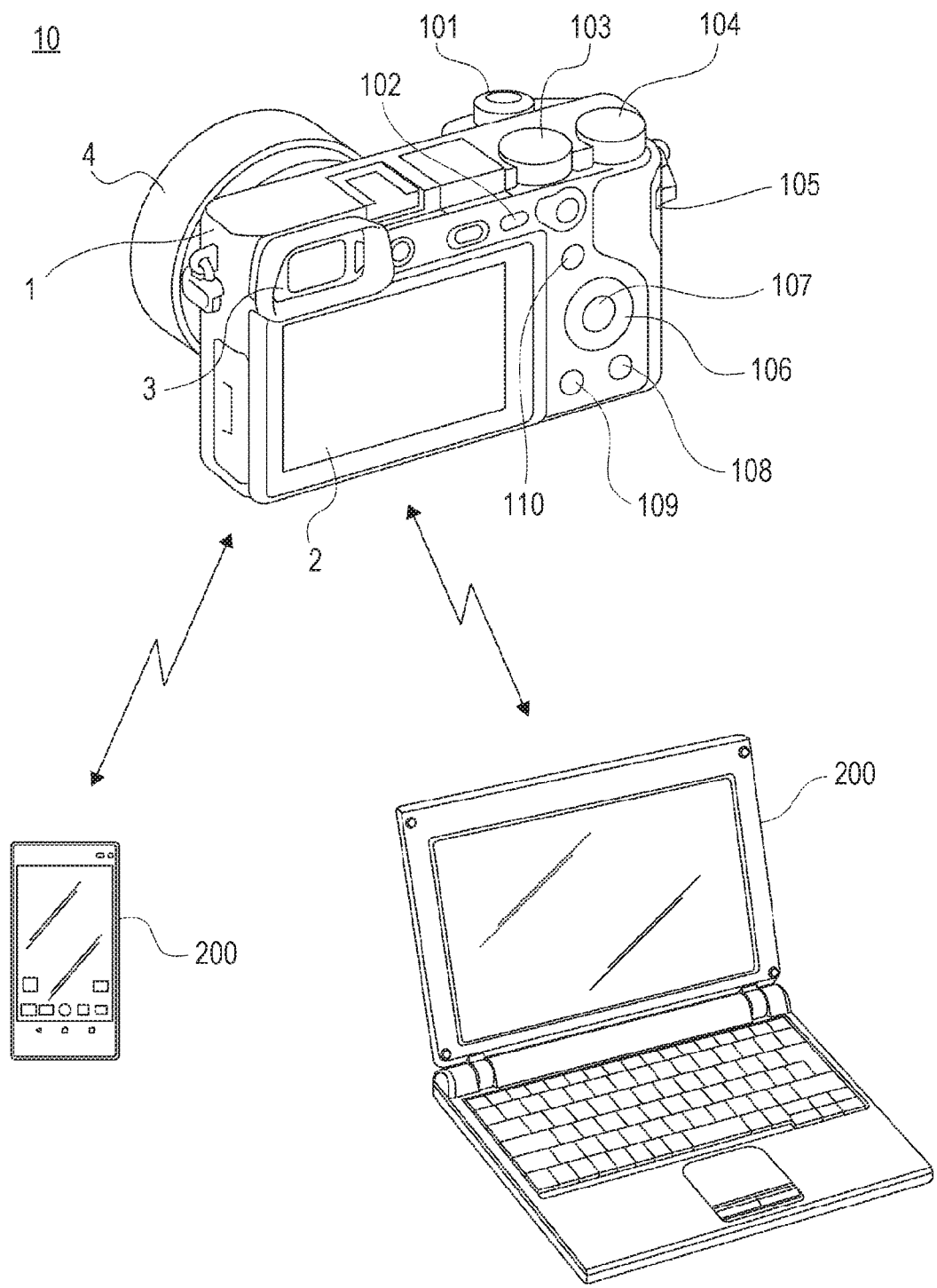
FIG. 1 is an explanatory diagram of an imaging apparatus according to an embodiment of the present technology.

FIG. 1 shows an external appearance example of an imaging apparatus 10 according to an embodiment. Here, the imaging apparatus 10 is a so-called digital still camera, and it is assumed that both still image imaging and moving image imaging can be executed by switching an imaging mode.

Note that, in the present embodiment, the imaging apparatus 10 is not limited to a digital still camera, but may be a video camera that is mainly used for moving image imaging but can also perform still image imaging.

In the imaging apparatus 10, a lens barrel 4 is arranged on or attachable to or detachable from a front side of a housing 1.

A display panel 2 including a display device such as a liquid crystal display (LCD) or an organic electro-luminescence (EL) display is provided on a back side (user side) of the imaging apparatus 10.

Furthermore, as a viewfinder 3, a display unit formed using an LCD, an organic EL display, or the like is also provided.

The user can visually recognize an image or various information with the display panel 2 or the viewfinder 3.

Here, the present embodiment is not limited to the case where both the display panel 2 and the viewfinder 3 are provided in the imaging apparatus 10, but the case where only one of the display panel 2 and the viewfinder 3 is provided, or the imaging apparatus 10 configured such that both or one of the display panel 2 and the viewfinder 3 is detachable may be possible.

Various operators are provided on the housing 1 of the imaging apparatus 10.

A shutter button 101 is used for shutter operation and focus operation in a half-pressed state.

A menu button 102 is an operator for instructing the display panel 2 or the like to display a menu.

A mode dial 103 is an operator for performing a switching operation of various imaging modes. In the present embodiment, the imaging mode at least includes the still image imaging mode and the moving image imaging mode.

A control dial 104 is an operator for changing various settings (for example, F-number and shutter speed).

A movie button 105 is an operator for giving an instruction on moving image recording.

A control wheel 106 is an operator for giving an instruction on, for example, cursor movement on a menu, change of setting values, and selection of up/down/left/right by rotation operation or up/down/left/right pressing operation.

A center button 107 is an operator that is arranged at the center of the control wheel 106 and is used for an operation of, for example, determining an item selected by the cursor.

A reproduction key 108 is an operator for giving an instruction on reproduction of a still image, a moving image, or the like that has been captured and recorded.

A custom key 109 is an operator that the user can arbitrarily assign a function and use.

A function key 110 is an operator that can call a registered function.

Above only the typical operators are shown, but various operators are provided in addition to these operators.

With such an imaging apparatus 10, the imaging apparatus 10 can perform imaging and reproduction alone, but can also operate in cooperation with other devices.

For example, FIG. 1 illustrates an information processing apparatus 200. For example, it is a portable information device such as a smartphone, or an apparatus such as a personal computer.

A still image or a moving image captured by the imaging apparatus 10 can be displayed by being transferred to the information processing apparatus 200 by wireless or wired communication.

Furthermore, an operation screen, a setting screen, and the like can be displayed on the information processing apparatus 200, and the operation information can be transmitted to the imaging apparatus 10, so that the imaging apparatus 10 can be operated remotely.

By the way, as an opportunity to use the imaging apparatus 10, there is a case where the imaging mode is suddenly switched and used.

For example, it is a case where a cameraman who is requested to capture a still image is also requested to capture a moving image by a client when working with one imaging apparatus 10.

Although the cameraman can capture a moving image in response to this request, it takes time and effort to change various settings, especially when switching the imaging mode.

Furthermore, even if the user is preliminarily requested to capture a moving image and a still image, because it is only required to bring one camera, one camera is often used by switching the imaging mode. In this case, the setting is changed each time the imaging mode is switched.

In order to deal with this case, it is conceivable to register the setting in advance for each imaging mode and call the corresponding setting in response to the switching of the imaging mode.

However, in that case, the setting registration operation becomes complicated, and the time and effort for registering the setting that is not changed in an imaging mode increases. Moreover, the user can be easily confused as to which imaging mode setting operation is to be performed.

Therefore, the present embodiment provides an appropriate user interface so as to be able to adapt to various usage opportunities and usage modes of a user and eliminate the trouble of changing settings for each imaging mode.

<2. Configuration of the Imaging Apparatus>

Figure 2:
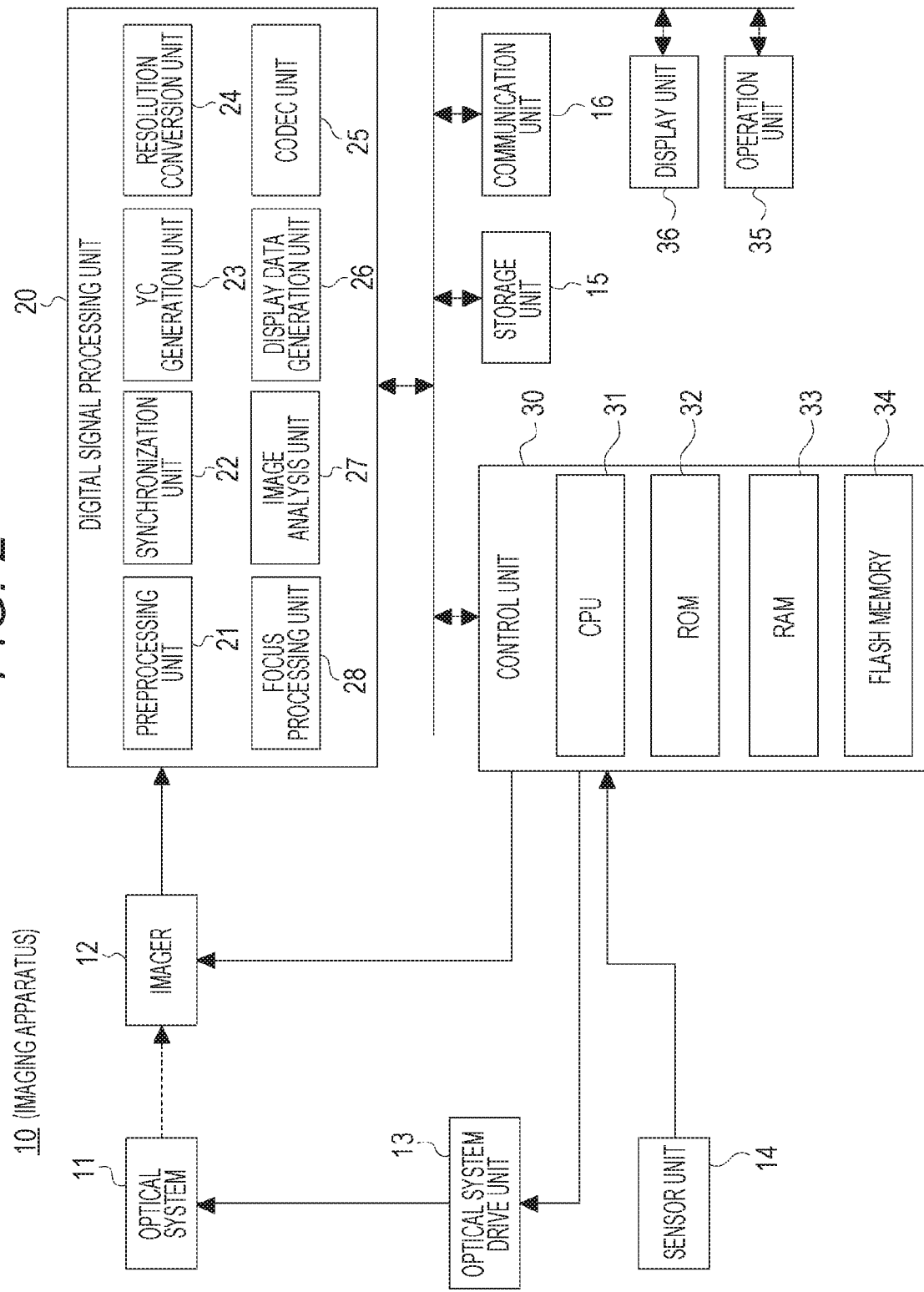
FIG. 2 is a block diagram of an internal configuration of the imaging apparatus according to an embodiment.

FIG. 2 shows an internal configuration example of the imaging apparatus 10 according to the embodiment.

The imaging apparatus 10 includes an optical system 11, an imager 12, an optical system drive unit 13, a sensor unit 14, a storage unit 15, a communication unit 16, a digital signal processing unit 20, a control unit 30, an operation unit 35, and a display unit 36.

The optical system 11 includes lenses such as a cover lens, a zoom lens, and a focus lens, and a diaphragm mechanism. The optical system 11 collects light from a subject on the imager 12.

The imager 12 includes an image sensor such as, for example, a charge coupled device (CCD), a complementary metal oxide semiconductor (CMOS), or the like.

In this imager 12, for an electric signal obtained by photoelectric conversion in the image sensor, for example, correlated double sampling (CDS) processing, automatic gain control (AGC) processing, and the like are executed, and furthermore analog/digital (A/D) conversion processing is performed. Then, a captured signal as digital data is output to the digital signal processing unit 20 in the subsequent stage.

The electronic shutter speed of the image sensor in the imager 12 is variably controlled by the control unit 30.

The optical system drive unit 13 drives the focus lens in the optical system 11 and executes a focus operation on the basis of control of the control unit 30. Furthermore, the optical system drive unit 13 drives the diaphragm mechanism in the optical system 11 and executes an exposure adjustment on the basis of control of the control unit 30. Moreover, the optical system drive unit 13 drives the zoom lens in the optical system 11 and executes a zoom operation on the basis of control of the control unit 30.

The digital signal processing unit 20 is configured as an image processing processor by, for example, a digital signal processor (DSP) and the like. The digital signal processing unit 20 performs various kinds of signal processing on a digital signal (captured image data) from the imager 12.

For example, the digital signal processing unit 20 includes a preprocessing unit 21, a synchronization unit 22, a YC generation unit 23, a resolution conversion unit 24, a codec unit 25, a display data generation unit 26, an image analysis unit 27, and a focus processing unit 28.

The preprocessing unit 21 performs clamp processing for clamping the black level of R, G, and B to a predetermined level, correction processing between color channels of R, G, and B, and the like on the captured image data from the imager 12.

The synchronization unit 22 performs demosaicing processing so that the image data for each pixel has all R, G, and B color components.

The YC generation unit 23 generates (separates) a luminance (Y) signal and a color (C) signal from R, G, and B image data.

The resolution conversion unit 24 executes resolution conversion processing on the image data on which various kinds of signal processing have been performed.

The codec unit 25 performs, for example, encoding processing for recording or communication on the image data on which the resolution conversion has been performed.

Under the control of the control unit 30, the display data generation unit 26 generates display data to be output to the display unit 36, for example, live view, that is, display data as a real-time monitoring screen generated by imaging on a subject side.

The display data as the live view (also referred to as a through image) is basically the data of each frame as the captured image data on which the resolution conversion has been performed by the resolution conversion unit 24.

Furthermore, the display data generation unit 26, on the basis of instructions of the control unit 30, also performs processing for displaying an operation image such as a guide image, a character image, a menu image, and the like by various guide icons and the like in the manner of superimposition on, for example, a live view or a predetermined background image.

The image analysis unit 27 performs image analysis processing in each frame unit (or in each intermittent frame), for example, on the captured image data (luminance signal/color signal) obtained by the YC generation unit 23, and performs processing related to detection of a subject type and a main subject as image content, and composition determination, processing of determining the status of luminance and color, and the like. Then, analysis results of these are provided for processing of the control unit 30. Furthermore, regarding the subject type, the image analysis unit 27 can also perform, for example, detection of the face of a person, body detection, detection of animals such as pets, and the like.

Furthermore, the image analysis unit 27 can also perform detection of the attributes of a person and the like. For example, the feature points of a face image detected by image analysis are determined, the attributes are identified, and the attribute information is generated. The attribute information is, for example, information as to whether the subject is an adult or a child, or information as to whether the subject is a woman or a man. Moreover, more detailed information such as age group may be determined.

Furthermore, the image analysis unit 27 performs various analysis processing such as line detection of horizontal lines, vertical lines, and the like in an image and determination of hue/saturation/brightness.

The focus processing unit 28 confirms the current focus state of frame image data for autofocus operation. For example, an evaluation value for determining the focus state is determined by a method such as detection of high-frequency component energy of the image data. For autofocusing, the control unit 30 causes the optical system drive unit 13 to execute focus lens drive while confirming the evaluation value from the focus processing unit 28 so as to perform control to a focused state.

Note that each of the display data generation unit 26, the image analysis unit 27, and the focus processing unit 28 is shown as a functional configuration executed by the digital signal processing unit 20 in the example of FIG. 2, but this is an example, and the processing of each of these units may be executed by the control unit 30.

The control unit 30 is configured by a microcomputer (arithmetic processing apparatus) including a central processing unit (CPU) 31, a read only memory (ROM) 32, a random access memory (RAM) 33, a flash memory 34, and the like.

The CPU 31 executes a program stored in the ROM 32, the flash memory 34, and the like to generally control the entire imaging apparatus 10.

The RAM 32, as a work region when the CPU 31 processes various data, is used for temporarily storing data, programs, and the like.

The ROM 32 and the flash memory (nonvolatile memory) 34 are used to store an operating system (OS) for the CPU 31 to control each unit, application programs, firmware, and the like for various operations.

The flash memory 34 is also used to store setting values of various setting items related to various signal processing or operations as an imaging operation.

Such a control unit 30 controls the operation of each necessary unit regarding various signal processing instructions in the digital signal processing unit 20, an imaging operation or a recording operation according to a user operation, a reproduction operation of a recorded image file, a camera operation such as zoom, focus, and exposure adjustment, a user interface operation, and the like.

The display unit 36 is a display unit that performs various displays for the user (person who captures an image and the like), and, as shown in FIG. 1, is configured to have a display device, for example, as the display panel 2 and the viewfinder 3 formed on the housing of the imaging apparatus 10.

This display unit 36 includes the display panel 2 and the viewfinder 3, and a display driver that causes these display devices to execute display.

The display driver executes various displays on the display device on the basis of the instructions of the control unit 30. For example, the display driver reproduces and displays a still image or a moving image captured and recorded on a recording medium, or displays a live view image based on the display data from the display data generation unit 26 on the screen of the display device. Furthermore, the display driver executes displaying various kinds of operation menus, icons, messages, guide displays, and the like, i.e., display as a graphical user interface (GUI), on the screen.

The operation unit 35 has an input function of inputting a user operation, and sends a signal corresponding to the input operation to the control unit 30.

The operation unit 35 is achieved as, for example, various operators (shutter button 101, menu button 102, and the like) provided on the housing of the imaging apparatus 10 as described in FIG. 1, a touch panel formed on the display unit 36, and the like.

Furthermore, various operations may be enabled by touch panel operations using a touch panel and icons, menus, or the like displayed on the display unit 36.

The storage unit 15 includes, for example, a nonvolatile memory, and functions as a storage region for storing image files (content files) such as still image data and moving image data, the attribute information of an image file, thumbnail images, and the like.

The image file is stored in a format such as, for example, joint photographic experts group (JPEG), tagged image file format (TIFF), and graphics interchange format (GIF).

Various practical configurations of the storage unit 15 are possible. For example, the storage unit 15 may be a flash memory built in the imaging apparatus 10 or may be in the form of a memory card that can be attached to and detached from the imaging apparatus 10 (for example, a portable flash memory) and a card recording/reproduction unit that performs recording/reproduction access to the memory card. Furthermore, it may be achieved as a hard disk drive (HDD) or the like as a form built in the imaging apparatus 10.

Furthermore, a program for executing various processing of the imaging apparatus 10, for example, display control and control relating to setting information, may be stored in the storage unit 15.

The communication unit 16 performs data communication or network communication with an external device by wire or wirelessly.

For example, communication of captured image data (still image file or moving image file) is performed with respect to an external display apparatus, recording apparatus, reproduction apparatus, and the like.

Furthermore, as a network communication unit, for example, communication may be performed via various networks such as the Internet, home network, local area network (LAN), and the like, and various data may be transmitted/received to/from servers, terminals, and the like on the network.

Furthermore, it is possible to perform communication with the information processing apparatus 200 shown in FIG. 1, for example, by short-range wireless communication as near field communication (NFC), Bluetooth (registered trademark), and the like. In that case, the communication unit 16 may receive the operation information from the information processing apparatus 200 and supply the operation information to the control unit 30.

Moreover, the communication unit 16 also includes a configuration as a reception unit corresponding to a dedicated remote controller of infrared type or radio wave type, which is not shown, and can also receive operation information from the remote controller and supply it to the control unit 30.

The sensor unit 14 comprehensively indicates various sensors. For example, a gyro sensor (angular velocity sensor), an acceleration sensor, and the like for detecting the overall movement of the imaging apparatus 10, such as camera shake, or the attitude or movement of the imaging apparatus 10 (pan movement, tilt movement, and the like) are provided.

Furthermore, an illuminance sensor that detects the external illuminance for exposure adjustment and the like, and furthermore a distance measurement sensor that measures the subject distance may be provided.

Furthermore, as the sensor unit 14, there may be provided a zoom lens position sensor that detects the position of the zoom lens and a focus lens position sensor that detects the position of the focus lens in the optical system 11.

Furthermore, as the sensor unit 14, a sensor that detects the aperture amount of a mechanical iris (diaphragm mechanism) may be provided.

The various sensors of the sensor unit 14 transmit the detected information to the control unit 30. The control unit 30 can perform various controls using the information detected by the sensor unit 14.

Figure 3:
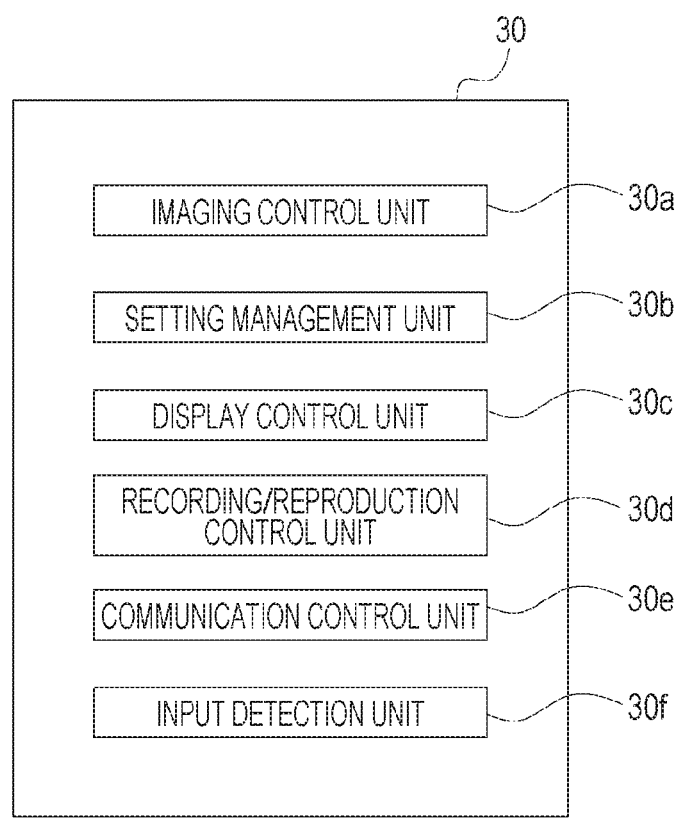
FIG. 3 is an explanatory diagram of a functional configuration of a control unit of the imaging apparatus according to an embodiment.

FIG. 3 shows various functions of the control unit 30 in blocks.

In the case of the present embodiment, the control unit 30 has functions as an imaging control unit 30a, a setting management unit 30b, a display control unit 30c, a recording/reproduction control unit 30d, a communication control unit 30e, and an input detection unit 30f.

These functions are implemented as functions achieved by software in the control unit 30, which is a microcomputer.

The imaging control unit 30a is shown as a function of controlling the imaging operation. For example, it is a function for giving an instruction on lens control and aperture control in the optical system 11, shutter speed control in the imager 12, and control of various processing of the digital signal processing unit 20.

The imaging control unit 30a performs these controls in various imaging modes according to user operations and setting information of various setting items.

The setting management unit 30b has a function of storing and managing various setting information. Although the setting information will be described later, there are items such as, for example, F-number, shutter speed, and white balance. Setting values for each of these setting items are stored in, for example, the flash memory 34 on the basis of a user operation so as to be referred to during actual control by the imaging control unit 30a. In particular, in the present embodiment, for various setting items, common setting regardless of a plurality of imaging modes (for example, still image imaging mode and moving image imaging mode) and independent setting for each imaging mode can be selected by a user operation. The setting management unit 30b executes management of the common setting/independent setting and processing of storing setting values according to various modes in the case of independent setting regarding various setting items.

Therefore, in a case where the user performs a setting change operation, the setting management unit 30b, in a case where the common setting is selected regarding a setting item of an operation target, updates the memory of common setting for a plurality of imaging modes in response to the setting change operation. Furthermore, in a case where the independent setting for each imaging mode is selected regarding a setting item of an operation target, the setting management unit 30b performs processing for updating the memory of the setting value of the setting item regarding the imaging mode of the operation target in response to the setting change operation of the imaging mode of the operation target.

The display control unit 30c controls the display data generation unit 26 of the digital signal processing unit 20 to execute various display operations on the display unit 36.

For example, the display control unit 30c controls live view display, reproduction display of a captured image, and the like. Furthermore, the display control unit 30c controls menu display, icon display, and the like according to operations, various modes, operation states, and the like.

In the present embodiment, the display control unit 30c also particularly executes display control relating to common setting/independent setting for various setting items. That is, the display control unit 30c controls the display mode on the setting operation screen depending on whether the setting items related to imaging in the plurality of imaging modes (for example, the still image imaging mode and the moving image imaging mode) are set to the common setting for the plurality of imaging modes or the independent setting for each imaging mode. Specifically, in a case where the setting items are common setting, the display control unit 30c controls the display data generation unit 26 so that a common setting operation screen for the plurality of imaging modes is displayed. Furthermore, the display control unit 30c, in a case where the setting item is independent setting, controls the display data generation unit 26 so that different setting operation screens are displayed for each imaging mode.

The recording/reproduction control unit 30d is a function of controlling recording/reproduction of captured image data in the storage unit 15.

The communication control unit 30e is a function of performing processing for performing transmission and reception with respect to an external device by the communication unit 16.

The input detection unit 30f is a function of detecting various information inputs. For example, operation information from the operation unit 35, input information from the communication unit 16, and various detection information from the sensor unit 14 are detected.

Note that each function in FIG. 3 is provided in the control unit 30, but these functions may be provided, for example, by being distributed in a plurality of microcomputers, and the digital signal processing unit 20 may include some or all of the functions.

<3. Setting Screen>

The setting screen in the imaging apparatus 10 will be described. The setting screen referred to here is a screen related to various setting items related to, for example, signal processing and operations at the time of imaging, and includes a setting menu screen on which at least a part of the setting item names or abbreviations are displayed in a menu, and a setting operation screen for confirming the setting value and changing the setting value regarding the selected setting item.

The setting menu screen and the setting operation screen described below are examples of a screen displayed as the display data generation unit 26 supplies necessary display data to the display unit 36 on the basis of control of the control unit 30 (display control unit 30c).

The imaging apparatus 10 is provided with various setting items relating to signal processing and operations at the time of imaging, and the user can arbitrarily change the setting values.

Here, the various setting items are items for which various parameters for controlling predetermined functions such as a function related to imaging, a function related to recording/reproduction, a function related to communication, and the like can be set.

Furthermore, examples of the function related to imaging include a function that affects a captured image acquired by imaging, a function that affects the display on the screen (live view) generated by imaging, a function related to imaging operations, a function related to overall camera operation and behavior, and the like.

The various setting items are setting items, specifically, for example, as is generally known, F-number, shutter speed, white balance, the presence or absence of camera shake correction, and the like.

Figure 4A:
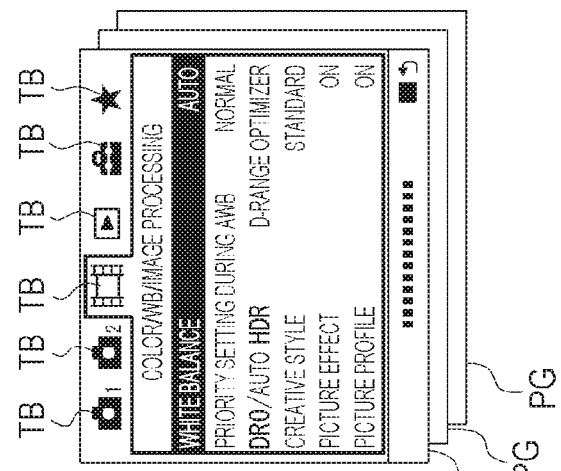
FIGS. 4A, 4B, and 4C is an are explanatory diagrams of a setting menu screen according to an embodiment.
Figure 4B:
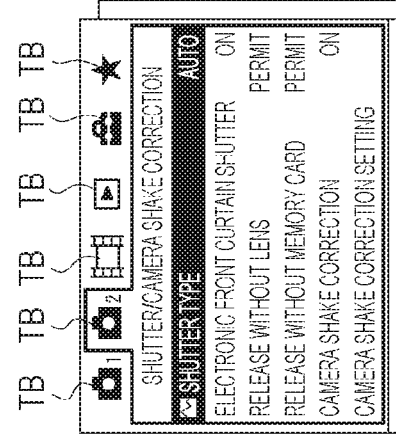
Figure 4C:
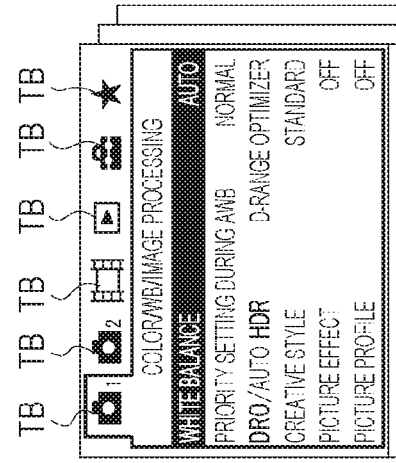

FIGS. 4A, 4B, and 4C show examples of the setting menu screen for providing the user with various setting items on the display unit 36.

Since there are many setting items, the setting items are grouped by tab TB in the menu, and by selecting the tab TB, the setting items of the corresponding group are displayed.

For example, as the tab TB, a tab for setting items related to imaging, a tab for setting items related to recording/reproduction, a tab for setting items related to communication, a tab for setting items related to operation, and the like are provided.

Here, as the display of the tab TB, which will be described later, a camera tab of an icon imitating the appearance of a camera, a moving image tab imitating the appearance of a film, and a recording/reproduction tab of an icon imitating the appearance of reproduction, a setup tab of an icon imitating the appearance of a bag, and a favorite tab imitating the appearance of a star can be displayed as shown in FIGS. 4A, 4B, and 4C, and although not shown, a communication tab of an icon imitating the appearance of communication and the like can also be displayed.

In FIGS. 4A and 4B, among them, a camera tab 50 in which an icon imitating the appearance of a camera is attached with numeral number "1" and a camera tab 60 in which an icon imitating the appearance of a camera is attached with numeral number "2" are shown as tabs for setting items related to imaging.

As setting items related to imaging, the camera tab 50 shows each setting item: "white balance", "priority setting during auto white balance (AWB)", "DRO/auto HDR", "creative style", "picture effect", and "picture profile".

Similarly, as setting items related to imaging, the camera tab 60 shows each setting item: "shutter type", "electronic front curtain shutter", "release without lens", "release without memory card", "camera shake correction", and "camera shake correction setting".

The meaning of each setting item will be described later.

Each of the camera tabs 50 and 60 has a plurality of pages PG, and various setting items are posted over a plurality of pages.

Note that various tab type settings and page breaks are possible. Furthermore, various methods for presenting a large number of setting items such as scroll display instead of page transition are possible. The tab configuration and the page configuration shown in FIGS. 4A, 4B, and 4C are mere examples.

The user can select any setting item from the camera tabs 50 and 60. Depending on the selection, the setting operation screen of the setting item is displayed, and the setting value can be changed.

The camera tabs 50 and 60 shown here are setting items related to imaging, but initially are setting items as common settings regardless of the imaging mode (still image imaging mode and moving image imaging mode).

For example, when the white balance in the camera tab 50 is set to "auto", the signal processing is executed as "auto" in both the still image imaging mode and the moving image imaging mode.

In the case of use with the white balance being common setting in this way, the user switches from the still image imaging mode to the moving image imaging mode in a case where the user wants to set the white balance setting value to "sunlight" for a moving image, for example. In this case, it is necessary to perform an operation of changing the white balance setting value on the camera tab 50.

Of course, such use may be performed, but it is inconvenient for a user who wants to strictly change the settings for still images and moving images or change many setting items.

Therefore, in the present embodiment, a moving image tab 70 of an icon imitating the appearance of a film as shown in FIG. 4C is provided. Here, the moving image tab 70 is exemplified to have similar setting items to those of the camera tab 50.

In practice, in the moving image tab 70, for example, setting items related to moving images, which are arranged in the camera tab 50 in a conventional imaging apparatus, and setting items dedicated to moving images are arranged.

The moving image tab 70 also has, for example, a plurality of pages PG, and various setting items are posted over a plurality of pages. Alternatively, a large number of setting items may be displayed by scrolling.

Such a moving image tab 70 is prepared so that it is sufficient if the moving image tab 70 is used in a case where the user performs setting in the moving image imaging mode.

For example, it is sufficient if the camera tabs 50 and 60 are used for setting of the still image imaging mode and the moving image tab 70 is used for setting of moving image imaging mode.

However, which setting item is different for a moving image and a still image differs depending on the user.

Furthermore, some users do not want to bother to change the settings between the moving image imaging mode and the still image imaging mode.

Some people feel troublesome or dislike to be confused when the moving image tab 70 is provided.

Therefore, in the present embodiment, the camera tabs 50 and 60 and the moving image tab 70 do not simply separate the setting of the still image imaging mode and the setting of the moving image imaging mode, but common setting/independent setting can be selected with respect to each setting item, the initial state is the common setting, and furthermore in the case of the common setting, the setting change from the camera tabs 50 and 60 and the setting change from the moving image tab 70 are reflected in common.

Figure 5:
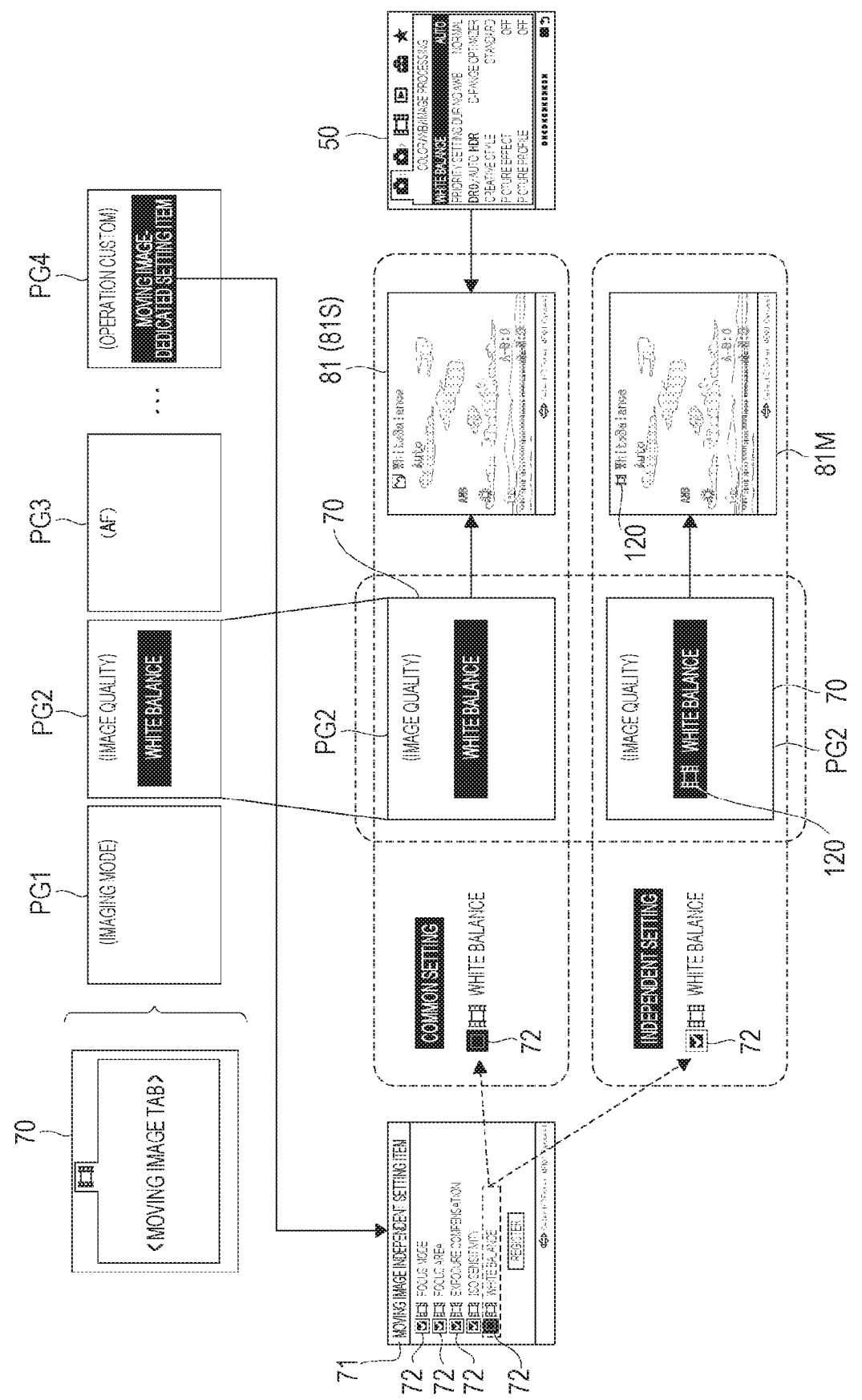
FIG. 5 is an explanatory diagram of transition from a moving image tab and a camera tab according to an embodiment.

Description is Given with Reference to FIG. 5.

First, in the moving image tab 70, setting items are posted over a plurality of pages PG (PG1, PG2 . . . ), but, for example, each is grouped. For example, the pages are divided into pages related to the imaging mode, the image quality, and the auto focus (AF).

As one of the pages PG, a page PG4 as an operation custom is provided, and a setting item called "moving image-dedicated setting item" is provided therein.

This "moving image-dedicated setting item" is an item for performing setting for selecting common setting/independent setting for each setting item. When the user performs an operation of selecting the "moving image-dedicated setting item", the control unit 30 performs control so that a moving image independent setting item screen 71 is displayed.

The control unit 30 enables the user to select common setting/independent setting for each setting item on the moving image independent setting item screen 71.

On the moving image independent setting item screen 71, various setting items such as, for example, focus mode, focus area, exposure compensation, ISO sensitivity, white balance, and the like are displayed in a list, and a check box 72 is prepared for each setting item. When the check box 72 is checked, it means that the independent setting is selected for the setting item.

The user can arbitrarily operate the check box 72 for each setting item to select common setting/independent setting.

Note that, on the moving image independent setting item screen 71, for example, all setting items for which common setting/independent setting can be selected are presented. Here, all setting items for which common setting/independent setting can be selected mean items of functions that can be set in common for still image imaging and moving image imaging.

Therefore, a large number of setting items appear on the independent setting item screen 71 by scrolling, page turning, or the like, and the check box 72 can be operated.

Then, in the initial state, the check box 72 is not checked, and it is assumed that the common setting is selected for all the setting items presented.

However, on the moving image independent setting item screen 71, common setting/independent setting may not be able to be selected for all the setting items related to both still image imaging and moving image imaging, but may be selected for some setting items.

Of course, it is not necessary to make common setting/independent setting selectable for setting items that are included only in the moving image tab 70 and are related only to moving image imaging.

Here, "white balance" will be taken as an example to describe screen transition in the case of common setting and in the case of independent setting.

The setting item "white balance" exists in both the camera tab 50 and the moving image tab 70. Therefore, the user can select "white balance" on the page PG2 of the image quality-related group of the moving image tab 70 or on the camera tab 50.

In a case where the setting item "white balance" is common setting, the display transitions to a WB setting operation screen 81 ("WB" is white balance. Hereinafter, the white balance may be referred to as "WB") even in a case where the user selects "white balance" on the camera tab 50 or even in a case where "white balance" is selected on the moving image tab 70.

On the WB setting operation screen 81, the user can select, for example, "auto", "sunlight", "shade", "cloudy", "bulb", and the like as the white balance setting value.

The white balance setting value selected here is a common setting value that is effective in both the still image imaging mode and the moving image imaging mode.

In a case where the setting item "white balance" is independent setting, and in a case where the user selects "white balance" on the camera tab 50, the display transitions to the WB setting operation screen 81. In this case, the WB setting operation screen 81 is displayed as a setting operation screen for the still image imaging mode, i.e., a still image WB setting operation screen 81S.

In this example, the WB setting operation screen 81 and the still image WB setting operation screen 81S are the same display mode, but as will be described later, the still image WB setting operation screen 81S may be a display mode different from that of the WB setting operation screen 81.

On this still image WB setting operation screen 81S, the user can select, for example, "auto", "sunlight", "shade", "cloudy", "bulb", and the like as the white balance setting value, but the white balance setting value selected here is a valid setting value in the still image imaging mode.

On the other hand, in a case where the user selects "white balance" on the moving image tab 70, the display transitions to a moving image WB setting operation screen 81M.

Also on this moving image WB setting operation screen 81M, the user can select, for example, "auto", "sunlight", "shade", "cloudy", "bulb", and the like as the white balance setting value, but the white balance setting value selected here is a common valid setting value in the moving image imaging mode.

On the moving image WB setting operation screen 81M, a moving image-dedicated setting icon 120 of an icon imitating the appearance of a film is displayed, which indicates that the item is set for moving image imaging independently of the setting for still image imaging. That is, it is a display mode different from the WB setting operation screen 81 in the case of common setting.

Furthermore, by displaying a moving image-dedicated setting icon 120, the moving image WB setting operation screen 81M is a display mode different from the still image WB setting operation screen 81S.

This allows the user to recognize that this screen is a screen for performing a setting operation in the moving image imaging mode for the white balance that is independent setting.

As described above, in the present embodiment, independent setting of setting items is prepared as a user customization function.

In the default state, the still image setting and the moving image setting are common similarly to before.

In a case where the user performs a setting such that the setting of the still image and the moving image is independent, the setting of the still image and the moving image becomes an independent state.

In the common setting state, the setting items on the camera tabs 50 and 60 and the moving image tab 70 are the entrances to the same setting operation screen. That is, there are the same two setting items.

In the independent setting state, the setting items on the camera tabs 50 and 60 are setting items for still images, and the setting items on the moving image tab 70 are setting items for moving images.

Since the setting items necessary for moving image imaging are collected as the moving image tab 70, it is only required to check only the inside of the moving image tab for normal imaging of a moving image.

Similarly, when capturing a still image, it is sufficient if the camera tabs 50 and 60 that are different from the moving image tab 70 are checked, and it is not necessary to see the items of moving image setting that is unnecessary for still image imaging.

It is an example that each setting item is the common setting by default in the above example. Of course, the setting items that can be selected may be independent setting by default.

In addition to the operation on the setting menu screen as described above, the setting change operation may be performed using the function key 110 or the custom key 109.

Specific examples of screen transition related to the setting change operation will be described below including the above cases.

Figure 6:
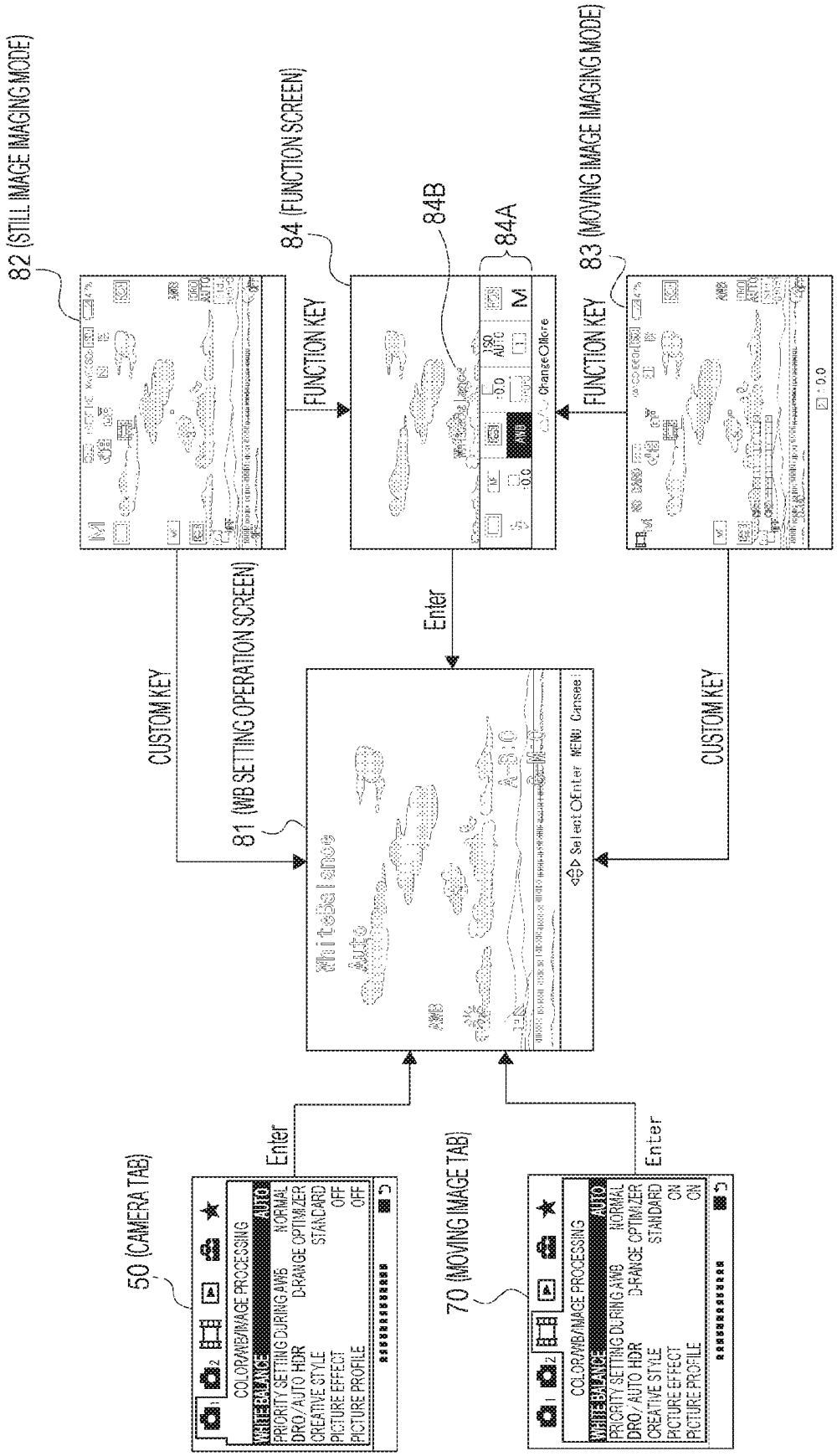
FIG. 6 is an explanatory diagram of transition to a white balance setting operation screen in the case of common setting according to an embodiment.
Figure 7:
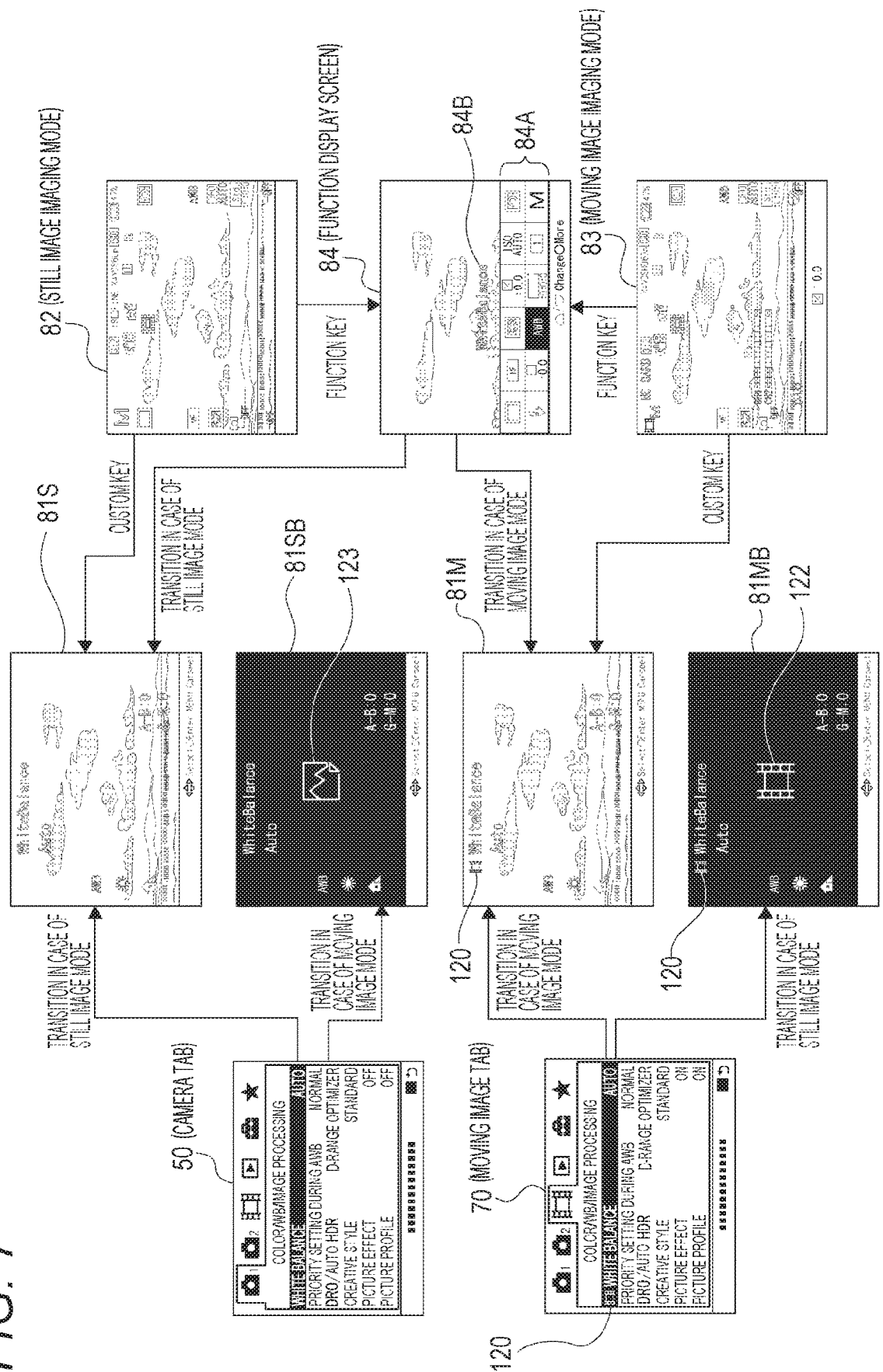
FIG. 7 is an explanatory diagram of transition to a white balance setting operation screen in the case of independent setting according to an embodiment.

FIGS. 6 and 7 show examples of screen transitions for the setting item "white balance" in each case of common setting/independent setting.

Regarding the setting of white balance, an operation is performed on the setting menu screen provided with the camera tab 50 and the moving image tab 70, and in a case where the white balance is registered in the function key 110, the screen can transition to the WB setting operation screen 81 from the operation of the function key 110. Furthermore, in a case where a white balance setting change operation is registered in the custom key 109, the WB setting operation screen 81 can be displayed by operating the custom key 109.

The following operation of the function key 110 and the custom key 109 will be described on the assumption that the relevant setting items are registered.

FIG. 6 shows screen transitions in a case where the white balance is common setting.

In a case where the setting item "white balance" is selected on the camera tab 50 on the setting menu screen, the display transitions to the WB setting operation screen 81 as described above. The WB setting operation screen 81 is a screen for performing a white balance setting change common to the still image imaging mode and the moving image imaging mode.

Then, the WB setting operation screen 81 is displayed such that the white balance setting change operation can be performed with a live view image as the background.

Even in a case where the setting item "white balance" is selected on the moving image tab 70 on the setting menu screen, the display also transitions to the WB setting operation screen 81.

In a case where the custom key 109 is operated while the imaging apparatus 10 is operating in the still image imaging mode (the same applies in a case where the white balance setting change operation is registered in the custom key 109), the display transitions, for example, from a still image imaging mode screen 82 to the WB setting operation screen 81.

In a case where the custom key 109 is operated while the imaging apparatus 10 is operating in the moving image imaging mode, the display transitions, for example, from a moving image imaging mode screen 83 to the WB setting operation screen 81.

Note that the still image imaging mode screen 82 is in a state of the still image imaging mode where, for example, a live view image, various icons, and the like are displayed.

Furthermore, the moving image imaging mode screen 83 is in a state of the moving image imaging mode where, for example, a live view image, various icons, and the like are displayed.

Furthermore, the current imaging mode of the imaging apparatus 10 is, for example, a mode selected by the mode dial 103.

In a case where the imaging apparatus 10 is in either the still image imaging mode or the moving image imaging mode, in a case where the function key 110 is operated, the function screen 84 is displayed.

The function screen 84 is a screen on which a registered function list 84A is presented on a live view image, for example, as the still image imaging mode screen 82 or the moving image imaging mode screen 83.

Here, each function listed in the function list 84A can be selected by the cursor. For example, when the cursor hits the item of white balance setting, for example, "White Balance" is displayed as its function name 84B. When the decision (enter) operation is performed, the selected function is executed.

In this way, when the white balance setting change operation is selected and decided on the function screen 84, the display transitions to the WB setting operation screen 81.

As described above, the user can display the WB setting operation screen 81 by various operations, and in this case, the white balance setting can be changed as common setting.

FIG. 7 shows screen transitions in a case where the white balance is independent setting.

In a case where the setting item "white balance" is selected on the camera tab 50 on the setting menu screen, and when the imaging apparatus 10 is operating in the still image imaging mode, the display transitions to the still image WB setting operation screen 81S.

This still image WB setting operation screen 81S is a screen for performing a white balance setting change in the still image imaging mode.

Then, the still image WB setting operation screen 81S is displayed such that the white balance setting change operation can be performed with a live view image as the background in the still image imaging mode.

In a case where the setting item "white balance" is selected on the moving image tab 70 on the setting menu screen, and when the imaging apparatus 10 is operating in the moving image imaging mode, the display transitions to the moving image WB setting operation screen 81M.

This moving image WB setting operation screen 81M is a screen for performing a white balance setting change for the moving image imaging mode.

Then, the moving image WB setting operation screen 81M is displayed such that the white balance setting change operation can be performed with a live view image as the background in the moving image imaging mode.

In a case where the custom key 109 is operated while the imaging apparatus 10 is operating in the still image imaging mode, the display transitions from the still image imaging mode screen 82 to the still image WB setting operation screen 81S.

In a case where the custom key 109 is operated while the imaging apparatus 10 is operating in the moving image imaging mode, the display transitions from the moving image imaging mode screen 83 to the moving image WB setting operation screen 81M.

In a case where the imaging apparatus 10 is in either the still image imaging mode or the moving image imaging mode, in a case where the function key 110 is operated, the function screen 84 is displayed.

When the white balance setting change operation is selected on the function screen 84, in the state of the still image imaging mode at that time, the display transitions to the still image WB setting operation screen 81S.

When the white balance setting change operation is selected on the function screen 84 in the state of the moving image imaging mode, the display transitions to the moving image WB setting operation screen 81M.

Therefore, when the white balance setting item is independent setting, when the user selects the white balance from the camera tab 50, operates the custom key 109 in the still image imaging mode, or selects the white balance setting from the function screen 84 in the still image imaging mode, it is possible to guide the still image WB setting operation screen 81S to change the white balance setting for the still image imaging mode.

Furthermore, when the user selects the white balance from the moving image tab 70, operates the custom key 109 in the moving image imaging mode, or selects the white balance setting from the function screen 84 in the moving image imaging mode, it is possible to guide the moving image WB setting operation screen 81M to change the white balance setting for the moving image imaging mode.

Moreover, in the present embodiment, since the camera tab 50 and the moving image tab 70 are provided, it is possible to set the white balance of another imaging mode regardless of the imaging mode at that time.

That is, the white balance of the camera tab 50 can be selected in the moving image imaging mode. In this case, the display transitions to a still image WB setting operation screen 81SB.

The background of the still image WB setting operation screen 81SB is not a live view image, but a black background or the like. Moreover, for example, a still image-dedicated setting icon 123, which is a relatively large icon imitating a still image (landscape), is displayed at the center of the screen.

In this way, by providing a display mode different from the normal still image WB setting operation screen 81S, the user is clearly notified of the fact that the screen for white balance setting of the still image imaging mode is presented although it is currently in the moving image imaging mode. This prevents the user from being confused by the operation.

In particular, by eliminating the live view image, it is possible to effectively appeal to the user that the operation screen is in an imaging mode different from the current imaging mode.

Furthermore, the white balance of the moving image tab 70 can be selected in the still image imaging mode. In this case, the display transitions to a moving image WB setting operation screen 81MB.

The background of the moving image WB setting operation screen 81MB is not a live view image, but a black background or the like. Moreover, for example, a moving image-dedicated setting icon 122, which is a relatively large icon imitating a film, is displayed at the center of the screen.

In this way, by providing a display mode different from the normal moving image WB setting operation screen 81M, the user is clearly notified of the fact that the screen for white balance setting in the moving image imaging mode is presented although it is currently in the still image imaging mode. This prevents the user from being confused by the operation. In this case as well, particularly by eliminating the live view image, it is possible to effectively appeal to the user that the operation screen is in an imaging mode different from the current imaging mode.

As understood from the above example, in a case where a certain setting item is independent setting, the setting change operation can be performed as described below.

The setting change operation for the still image imaging mode for a certain setting item is possible by:

Selection of setting items from the camera tab 50 (or 60) regardless of the imaging mode Operation of the custom key 109 in the still image imaging mode Operation from the function screen 84 in the still image imaging mode Furthermore, the setting change operation for the moving image imaging mode for a certain setting item is possible by:

Selection of setting items from the moving image tab 70 regardless of the imaging mode Operation of the custom key 109 in the moving image imaging mode Operation from the function screen 84 in the moving image imaging mode By the way, in the example of FIG. 7, an example is indicated in which in a case where the white balance is independent setting, the moving image-dedicated setting icon 120 is displayed for the setting item "white balance" on the moving image tab 70.

In this way, regarding the setting items in the moving image tab 70, by displaying the moving image-dedicated setting icon 120 together in the case of independent setting, the setting items of independent setting and the setting items of common setting can be clearly distinguished by the user in the moving image tab 70. This is also effective in improving the user's understanding of the operation and preventing the operation from being confused.

Furthermore, the setting items of independent setting are a display mode different from those of common setting (see FIG. 6), which makes it easier for the user to recognize the independent setting.

Furthermore, in the example of FIG. 7, an icon is not particularly displayed for the setting item "white balance" on the camera tab 50 side.

That is, in the example of FIG. 7, for the setting item of independent setting, the display mode of the display in the camera tab 50 and the display mode of the display in the moving image tab 70 are different. That is, the presence/absence of the moving image-dedicated setting icon 120 is different.

This makes it easy for the user to recognize that the operation from the camera tab 50 and the operation from the moving image tab 70 have different contents (difference between the still image imaging mode and the moving image imaging mode).

Figure 8:
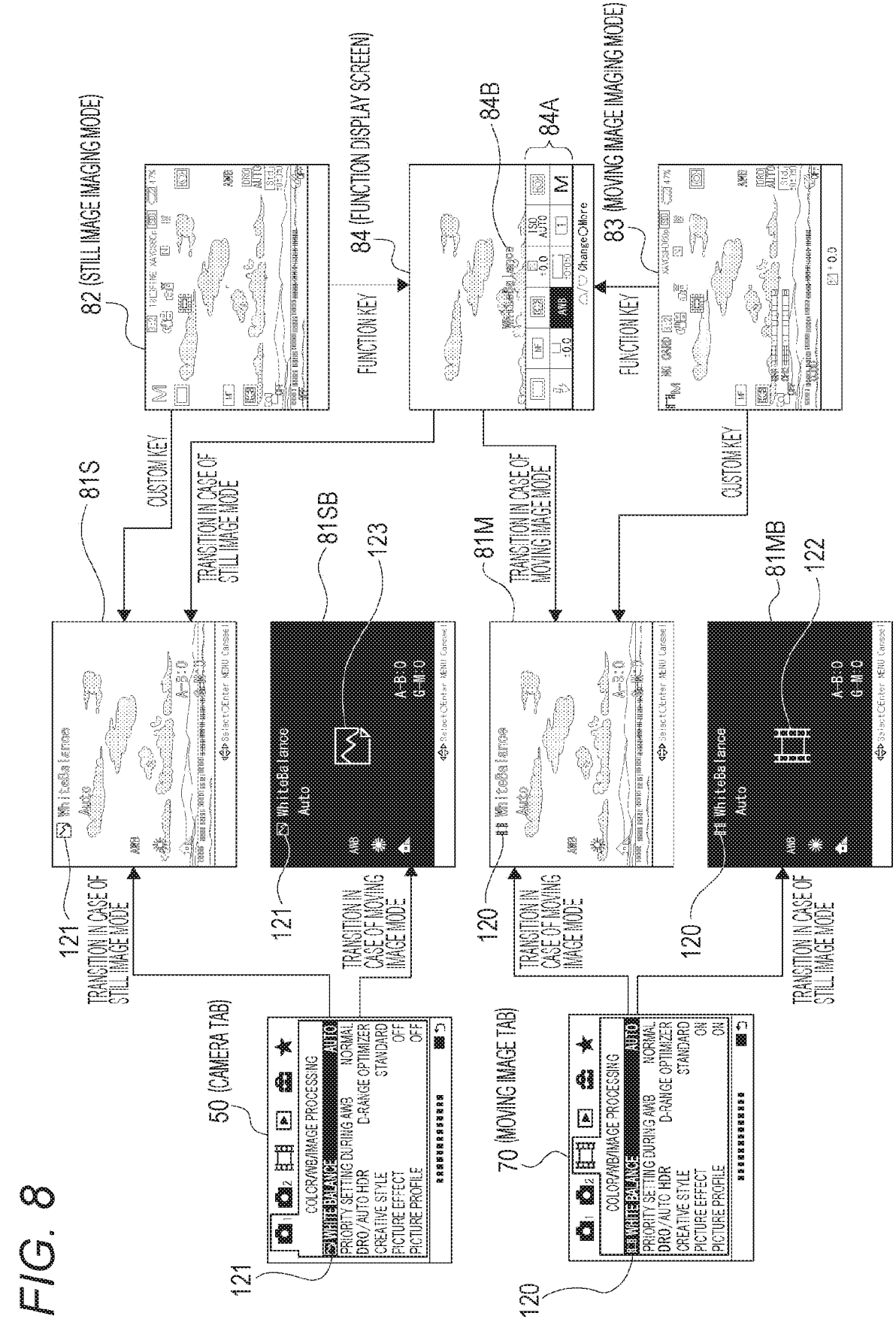
FIG. 8 is an explanatory diagram of a white balance setting operation screen in the case of independent setting according to an embodiment.

FIG. 8 shows a variation related to icon display in the screen transition for the white balance setting which is independent setting similarly to FIG. 7.

FIG. 8 shows an example in which the still image-dedicated setting icon 121, which is an icon imitating a still image (landscape), is displayed, indicating that it is an item set for still image imaging independently of setting of moving image imaging with respect to the setting item "white balance" in the camera tab 50. On the moving image tab 70, the moving image-dedicated setting icon 120 is displayed for the setting item "white balance".

As described above, in both the camera tab 50 and the moving image tab 70, for the setting items of independent setting, by displaying the still image-dedicated setting icon 121 or the moving image-dedicated setting icon 120, the user can easily distinguish common setting/independent setting for each setting item in the camera tab 50 or the moving image tab 70.

Furthermore, in the present embodiment, examples of a different display mode include icons (moving image-dedicated setting icons 120 and 122, and still image-dedicated setting icons 121 and 123) and background images (for example, live view images and black background). However, the present embodiment is not limited to this, and, for example, the font size and color of the setting item may be changed, or the highlight display, blinking display, and the like may be performed according to either common setting/ independent setting. Moreover, various image effects such as addition of various icons and character images, screen tint, and blurring are assumed, for example.

Furthermore, in either case of the camera tab 50 and the moving image tab 70, the setting items of independent setting are a display mode different from those of common setting, which makes it easier for the user to recognize the independent setting.

Furthermore, for the setting items of independent setting, the display mode of display in the camera tab 50 is different from that in the moving image tab 70 depending on the still image-dedicated setting icon 121 and the moving image-dedicated setting icon 120. Therefore, it is easy for the user to recognize that the contents of the operation from the camera tab 50 and the operation from the moving image tab 70 are different (difference between the still image imaging mode and the moving image imaging mode).

In the example of FIG. 7, the moving image-dedicated setting icon 120 is displayed next to the white balance indication on the moving image WB setting operation screen 81M.

On the other hand, on the still image WB setting operation screen 81S, no icon is particularly displayed next to the white balance indication.

In this way, by differentiating the display mode between the still image WB setting operation screen 81S and the moving image WB setting operation screen 81M, it is easy for the user to recognize whether it is a setting change operation for the still image imaging mode or a setting change operation for the moving image imaging mode.

Furthermore, the moving image-dedicated setting icon 120 provides a display mode different from the WB setting operation screen 81 in the case of the common setting of FIG. 6. Thus, it is easy for the user to recognize whether the setting change operation is performed on the setting item of common setting or the setting item of independent setting.

An example as shown in FIG. 8 can also be possible.

In the example of FIG. 8, the moving image-dedicated setting icon 120 is displayed next to the white balance indication on the moving image WB setting operation screen 81M, and the still image-dedicated setting icon 121 is displayed next to the white balance indication on the still image WB setting operation screen 81S.

In this way, by differentiating the display mode between the still image WB setting operation screen 81S and the moving image WB setting operation screen 81M, it is easy for the user to recognize whether it is a setting change operation for the still image imaging mode or a setting change operation for the moving image imaging mode.

Furthermore, on both the moving image WB setting operation screen 81M and the still image WB setting operation screen 81S, the moving image-dedicated setting icon 120 and the still image-dedicated setting icon 121 provide a display mode different from the WB setting operation screen 81 in the case of the common setting of FIG. 6, and thus it is easy for the user to recognize whether the setting change operation is performed on the setting item of common setting or the setting item of independent setting.

The display modes of the moving image-dedicated setting icon 120 and the still image-dedicated setting icon 121 on the moving image WB setting operation screen 81M and the still image WB setting operation screen 81S described above can be applied to the moving image WB setting operation screen 81MB and the still image WB setting operation screen 81SB as shown in FIGS. 7 and 8.

Next, the case of setting items that cannot be provided on the setting menu screen will be described with reference to FIG. 9.

For the sake of description, it is assumed that the "F-number" and the "shutter speed" are not included in the camera tab 50 or the moving image tab 70 described above, and these are subjected to a setting change operation using the custom key 109 or the function key 110.

Note that, also for setting items not listed on the setting menu screen (camera tabs 50 and 60 and moving image tab 70), it is desirable that common setting/independent setting can be selected on the moving image independent setting item screen 71 shown in FIG. 5.

Figure 9:
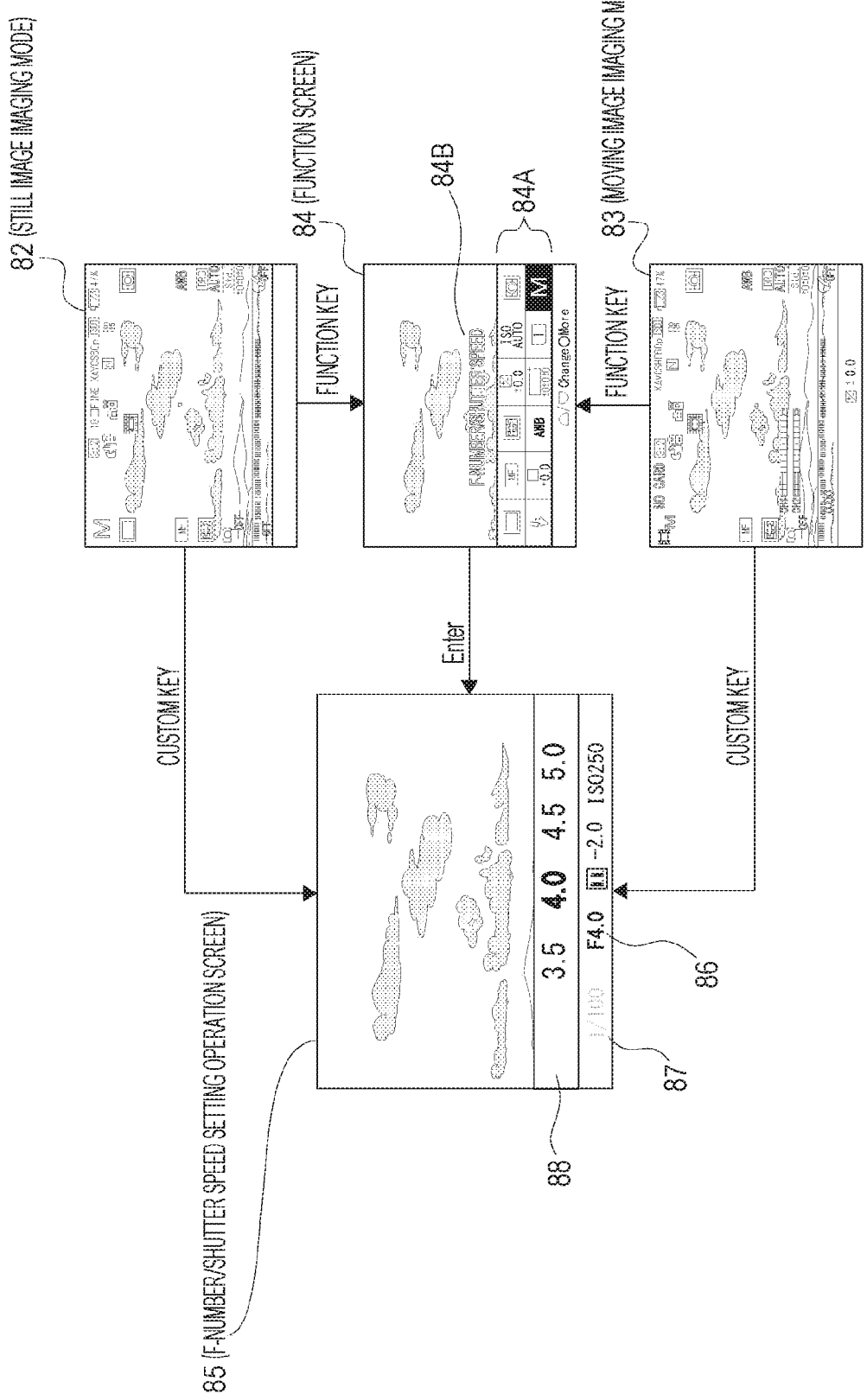
FIG. 9 is an explanatory diagram of transition to an F-number/shutter speed setting operation screen in the case of common setting according to an embodiment.

FIG. 9 is a case where the setting items of F-number and shutter speed are common setting.

In a case where the custom key 109 is operated while the imaging apparatus 10 is operating in the still image imaging mode (the same applies in a case where the F-number and shutter speed setting change operation is registered in the custom key 109), the display transitions, for example, from the still image imaging mode screen 82 to the F-number/ shutter speed setting operation screen 85.

Furthermore, in a case where the custom key 109 is operated while the imaging apparatus 10 is operating in the moving image imaging mode, the display transitions, for example, from the moving image imaging mode screen 83 to the F-number/shutter speed setting operation screen 85.

The F-number/shutter speed setting operation screen 85 is a screen on which, for example, a live view image is displayed, and an image for setting operation is displayed thereon, for example, similarly to the still image imaging mode screen 82 or the moving image imaging mode screen 83.

In this case, a current F-number 86 and a current shutter speed value 87 are displayed. In a case where the F-number is selected as a change objective, the display of the current F-number 86 becomes more emphasized than the current shutter speed value 87 by, for example, highlighting display or display color change. Then, a change value of the F-number is displayed on a variable bar 88. For example, the variable bar 88 is scrolled so that the F-number increases or decreases according to a dial operation.

In a case where the shutter speed is a change objective, the current shutter speed value 87 is emphasized, and the shutter speed value is displayed to increase or decrease on the variable bar 88 according to a dial operation.

Such an F-number/shutter speed setting operation screen 85 is a screen for performing a setting change of the F-number or the shutter speed common to the still image imaging mode and the moving image imaging mode.

In a case where the imaging apparatus 10 is in either the still image imaging mode or the moving image imaging mode, in a case where the function key 110 is operated, the function screen 84 is displayed.

When the F-number/shutter speed setting change operation is selected and decided on the function screen 84, the display transitions to the F-number/shutter speed setting operation screen 85.

As described above, the user can display the F-number/ shutter speed setting operation screen 85 by operating the custom key 109 or the function key 110. In this case, a setting change of the F-number and the shutter speed can be performed as common setting.

Figure 10:
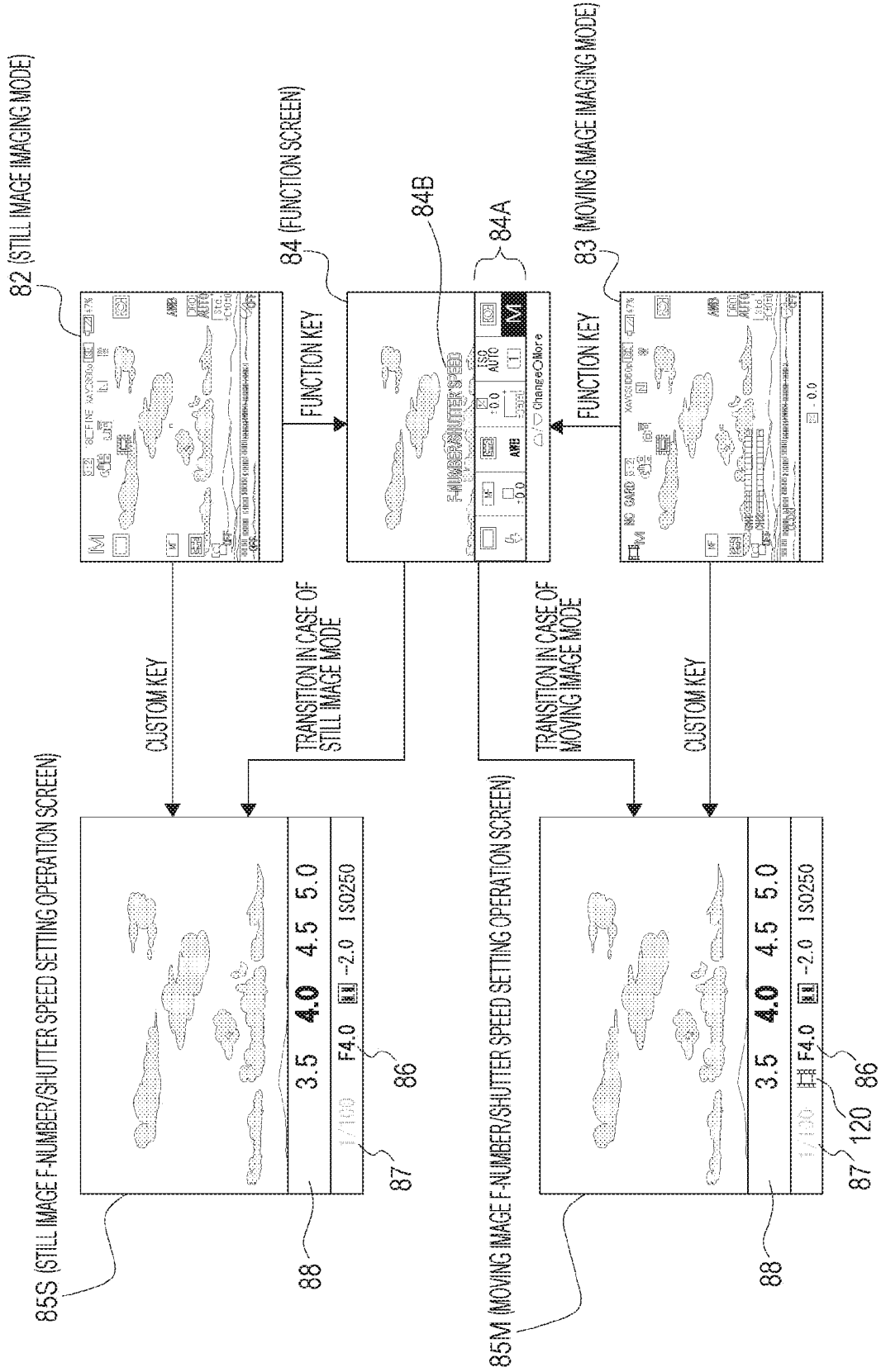
FIG. 10 is an explanatory diagram of transition to an F-number/shutter speed setting operation screen in the case of independent setting according to an embodiment.

FIG. 10 shows screen transitions in a case where the F-number/shutter speed is independent setting.

In a case where the custom key 109 is operated while the imaging apparatus 10 is operating in the still image imaging mode, the display transitions from the still image imaging mode screen 82 to a still image F-number/shutter speed setting operation screen 85S.

This still image F-number/shutter speed setting operation screen 85S is a screen for performing a setting change of the F-number or the shutter speed in the still image imaging mode.

Then, the still image F-number/shutter speed setting operation screen 85S is displayed such that the F-number or shutter speed setting change operation can be performed with a live view image as the background in the still image imaging mode.

In a case where the custom key 109 is operated while the imaging apparatus 10 is operating in the moving image imaging mode, the display transitions from the moving image imaging mode screen 83 to a moving image F-number/shutter speed setting operation screen 85M.

This moving image F-number/shutter speed setting operation screen 85M is a screen for performing a setting change of the F-number or the shutter speed in the moving image imaging mode.

Then, the moving image F-number/shutter speed setting operation screen 85M is displayed such that the F-number or shutter speed setting change operation can be performed with a live view image as the background in the moving image imaging mode.

Also in the case of the moving image F-number/shutter speed setting operation screen 85M, the moving image-dedicated setting icon 120 is displayed so that the user can distinguish the screen from the still image F-number/shutter speed setting operation screen 85S.

In a case where the imaging apparatus 10 is in either the still image imaging mode or the moving image imaging mode, in a case where the function key 110 is operated, the function screen 84 is displayed.

When the F-number/shutter speed setting change operation is selected on the function screen 84, in the state of the still image imaging mode at that time, the display transitions to the still image F-number/shutter speed setting operation screen 85S.

In the state of the moving image imaging mode when the F-number/shutter speed setting change operation is selected on the function screen 84, the display transitions to the moving image F-number/shutter speed setting operation screen 85M.

As described above, even for the setting items not included on the setting menu screen, the screen transition is performed according to common setting/independent setting, and the setting change is possible according to common setting/independent setting.

Note that, although the case of the custom key 109 and the function key 110 has been described here, for example, as a function of the function key 110, such setting change may not be performed.

Of course, the case where the function key 110 is not provided or the case where the custom key 109 is not provided is possible, but it is sufficient if the screen transition according to common setting/independent setting is performed similarly by a predetermined operation.

Next, FIGS. 11A and 11B show an example of a case where the setting menu screen is shifted to the setting operation screen. Here, a setting item "APS-C/Super 35 mm" is taken as an example.

It is a case where, for example, this setting item is selected on the camera tab 50 or the moving image tab 70 and a setting operation screen 89 is displayed.

In a case where the setting item is common setting, the setting operation screen 89 of FIG. 11A is displayed and "on", "auto", or "off" can be selected as the setting value.

In a case where the setting item is independent setting and is selected from the moving image tab 70, a moving image setting operation screen 89M of FIG. 11B is displayed, and "on", "auto", or "off" can be selected as a setting value for the moving image imaging mode.

On the moving image setting operation screen 89M, the moving image-dedicated setting icon 120 is displayed next to the setting item name "APS-C/Super 35 mm".

Furthermore, in a case where the setting item is independent setting and is selected from the camera tab 50, a still image setting operation screen 89S of FIG. 11A is displayed, and "on", "auto", or "off" can be selected as a setting value for the still image imaging mode.

Note that although the setting operation screen 89 in the case of common setting and the still image setting operation screen 89S have the same display mode here, in the case of the still image WB setting operation screen 81S, the still image-dedicated setting icon 121 may be displayed.

At least by the moving image-dedicated setting icon 120 (or by both the moving image-dedicated setting icon 120 and the still image-dedicated setting icon 121), the display mode is made different, such that the user can distinguish common setting/independent setting in each case.

Figure 12A:
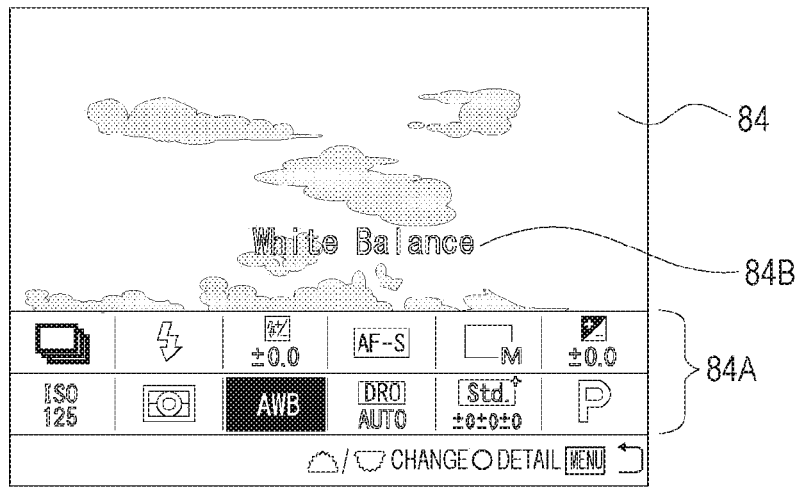
FIGS. 12A, 12B, and 12C are explanatory diagrams of a function screen according to an embodiment.
Figure 12B:
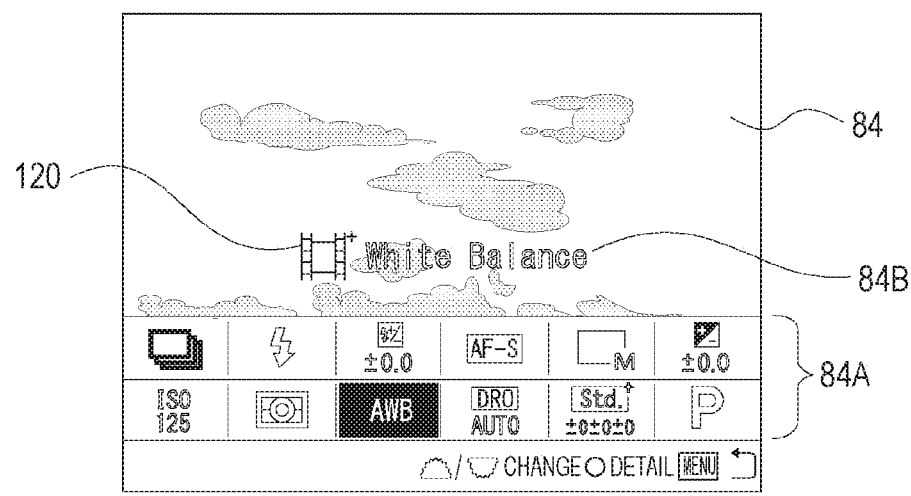
Figure 12C:
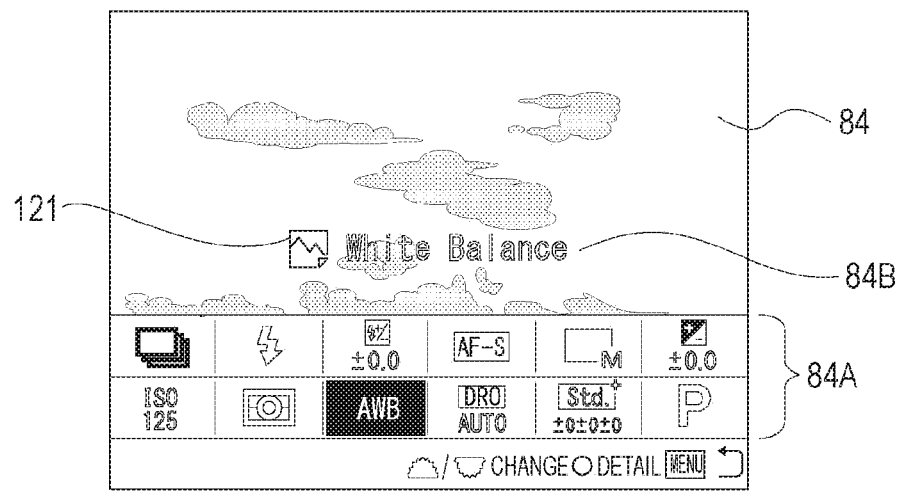

FIGS. 12A, 12B, and 12C show an example of icon display on the function screen 84 described above.

FIG. 12A is a display example of the function screen 84, for example, in a case where the white balance is common setting, and FIG. 12B is a display example of the function screen 84 in a case where the white balance setting is independent setting and is currently in the moving image imaging mode.

Note that a display example of FIG. 12A or 12C is conceivable as the display example of the function screen 84 in a case where the white balance setting is independent setting and is currently in the still image imaging mode.

In the still image imaging mode as common setting or independent setting, the display in FIG. 12A is displayed, and in the moving image imaging mode as independent setting, the display in FIG. 12B is displayed, so that the user can recognize the moving image independent setting also on the function screen 84. Furthermore, it is easy for the user to recognize whether the setting item of independent setting is the setting for a still image or the setting for a moving image.

When the display in FIG. 12A is given in the case of common setting, the display in FIG. 12B is given in the moving image imaging mode as independent setting, and the display in FIG. 12C is given in the still image imaging mode as independent setting, the user can easily recognize common setting/independent setting also on the function screen 84. Furthermore, it is easy for the user to recognize whether the setting item of independent setting is the setting for a still image or the setting for a moving image.

Although examples of screen transitions and display modes have been described above in various examples, these can be applied to various setting items.

The following is an example of setting items for which common setting/independent setting can be selected.

As a setting item that enables selection of common setting/independent setting, first, a setting that affects a captured image acquired by imaging is considered. That is, it is a setting item that affects the appearance of the image. For example, the following setting items are applicable.

Shutter speed

F-number

Focus mode
Focus area
Exposure compensation
ISO sensitivity
Metering mode
White balance
DRO/Auto HDR
Creative style
Picture effect
Picture profile
APS-C/Super 35 mm
Focus set "Shutter speed" is a setting item for selecting the shutter speed. Both the shutter speed of a mechanical shutter in the optical system 11 and the electronic shutter speed controlled by the imager 12 can be considered as the selection target.

"F-number" is a setting item for selecting the F-number.

"Focus mode" is a focusing method, and is a setting item for selecting an autofocus method, such as an autofocus method or a manual focus method.

"Focus area" is a setting item for selecting the focus position. For example, "wide", "flexible spot", or the like can be selected.

"Exposure compensation" is a setting item for compensating the brightness of an entire image.

"ISO sensitivity" is a setting item for selecting "ISO", "Auto", or the like as the ISO sensitivity.

"Metering mode" is a setting item for choosing "multi", "spot", or the like as a method of measuring brightness.

"White balance" is a setting item that can select "auto", "sunlight", or the like in the setting of processing for adjusting a white object to a color close to white according to the light conditions of an imaging location.

"DRO/auto HDR" is a setting item for processing to analyze the difference in light and darkness of a subject or background by dividing it into fine regions and obtain an image of optimum brightness and gradation.

"Creative style" is a setting item that enables selection of the finish of a favorite image and adjustment of contrast, saturation, and sharpness.

"Picture effect" is a setting item that is selected in order to capture a more impressive and artistic expression image using a favorite effect.

"Picture profile" is a setting item that allows finely changing settings such as color development and gradation of an image to be captured.

"APS-C/Super 35 mm" is a setting item for setting as to whether to record in a size equivalent to APS-C size in the case of still image imaging and a size equivalent to Super 35 mm in the case of moving image imaging.

"Focus set" is a setting item for the function of focusing using a front dial, a rear dial, and a control wheel.

Furthermore, as a setting item that allows selection of common setting/independent setting, a setting item as a setting (setting related to imaging assistance) that affects display of a screen (live view) generated by imaging is conceivable. For example, the following setting items are applicable.

Face detection
Zebra
Peaking level
Peaking color

"Face detection" is a setting item for a function in which the camera determines the face of a person and adjusts the focus, exposure, image processing, and flash according to the person.

"Zebra" is a setting item for setting a striped display that serves as a guide for brightness adjustment.

"Peaking level" is a setting item for setting the contour of a focused portion in a designated color in an emphasized manner during manual focus imaging.

"Peaking color" is a setting item for setting the color of peaking display for displaying the contour in an emphasized manner.

Furthermore, as a setting item that enables selection of common setting/independent setting, a setting item as a setting (key assignment) related to the imaging operation is conceivable. For example, the following setting items are applicable.

Function menu setting
Custom key (imaging)
Dial/wheel setting
Dial/wheel exposure compensation "Function menu setting" is a setting item related to the function setting of the function screen 84 displayed by operating the function key 110.

"Custom key" is a setting item of the operation setting related to imaging in a case where the custom key 109 is used. When a function is preset in the custom key 109, the function that has been set can be executed only by pressing the key at the time of imaging. This is related to that setting.

"Dial/wheel setting" is a setting item for assigning the operation content of the control dial 104. For example, whether to assign shutter speed or aperture value is set.

"Dial/wheel exposure compensation" is a setting item that allows exposure compensation with either dial.

Furthermore, as a setting item that enables selection of common setting/independent setting, a setting item related to the general operation/behavior of the camera is conceivable. For example, the following setting items are applicable.

FINDER/MONITOR
DISP button
Exposure value step range
Camera shake correction
Zoom setting
Focus enlargement period
Lens correction
Grid line
Reset exposure compensation value
Spot metering position
Exposure reference adjustment
Priority setting during AWB
Camera shake correction setting "FINDER/MONITOR" is a setting item for setting a display switching method between the viewfinder 3 and the display panel 2.

"DISP button" is a setting item for setting the content displayed on the viewfinder 3 or the display panel 2 when a predetermined display button is pressed.

"Exposure value step range" is a setting item for setting the setting range of the shutter speed, the aperture value, and the exposure compensation value.

"Camera shake correction" is a setting item for setting camera shake correction during imaging.

"Zoom setting" is a setting item for setting whether to use all-pixel super-resolution zoom or digital zoom.

"Focus enlargement period" is a setting item for setting the period of time for enlarging and displaying an image before imaging to confirm the focus.

"Lens correction" is a setting item for selecting the type of lens correction.

"Grid line" is a setting item that displays lines for adjusting composition.

"Reset exposure compensation value" is a setting item for setting whether to retain the value set for exposure compensation when the power is turned off with the exposure compensation dial set to "0".

"Spot metering position" is a setting item for setting whether the spot metering position is linked to the focus area when the focus area is set to "flexible spot" or "extended flexible spot".

"Exposure reference adjustment" is a setting item that allows the reference of the proper exposure value of a camera to be adjusted for each metering mode.

"Priority setting during AWB" is a setting item for setting a priority color tone under a light source such as an incandescent light bulb when the white balance is "auto".

"Camera shake correction setting" is a setting item for setting the camera shake correction.

The examples of setting items that can select common setting/independent setting have been described above, but the setting items are not limited to these.

Furthermore, it is not necessary that all of these can select common setting/independent setting.

<4. Example of Processing of the Control Unit>

Processing examples executed by the control unit 30 as the display control according to common setting/independent setting and the setting management processing according to the setting change operation will be described with reference to FIGS. 13, 14, and 15. The processing example described below is a processing example achieved by the control unit 30 having the hardware configuration of FIG. 2 having a functional configuration of FIG. 3 by software, particularly a setting management unit 30b and a display control unit 30c.

Figure 13:
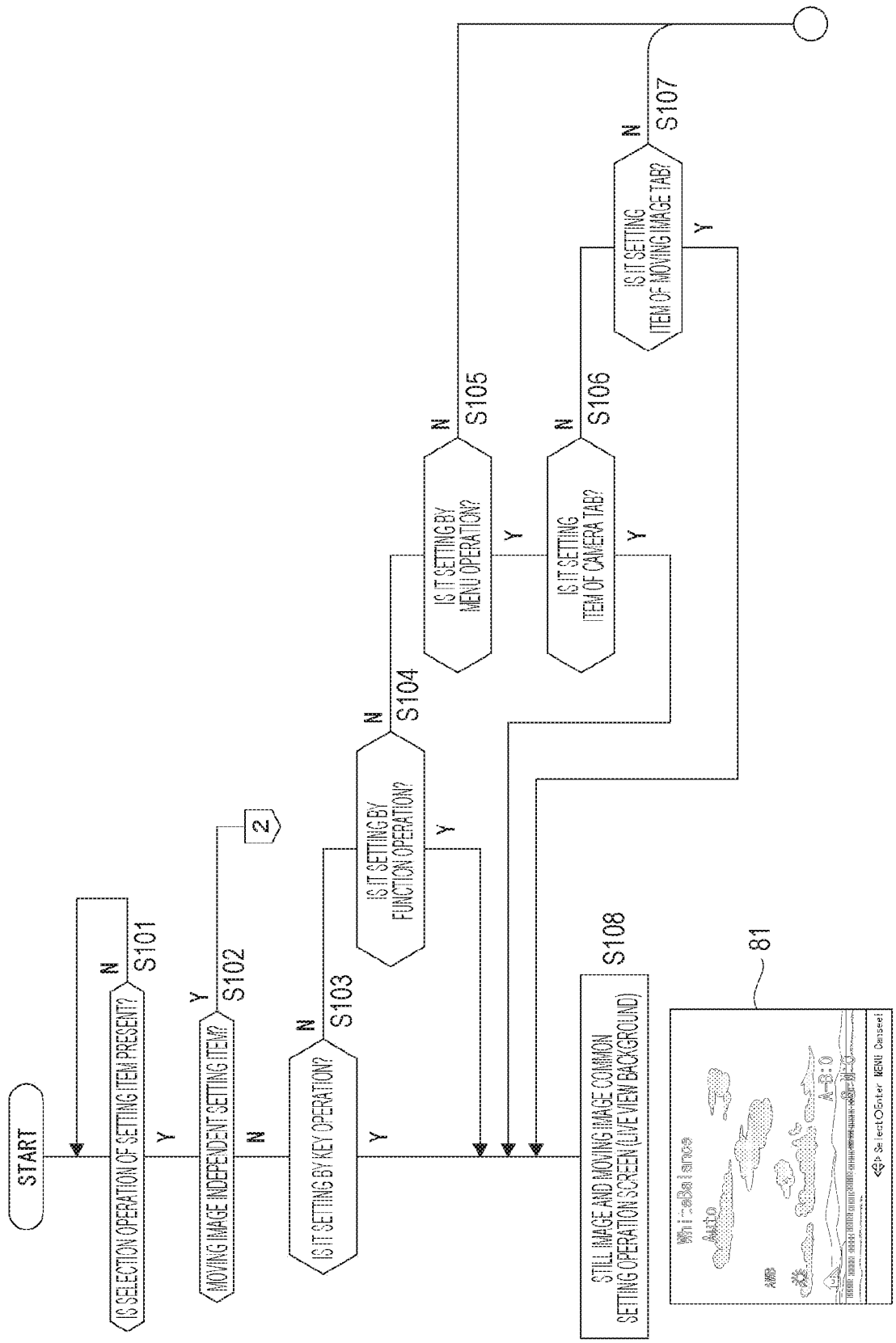
FIG. 13 is a flowchart of display control processing of the control unit according to an embodiment.
Figure 14:
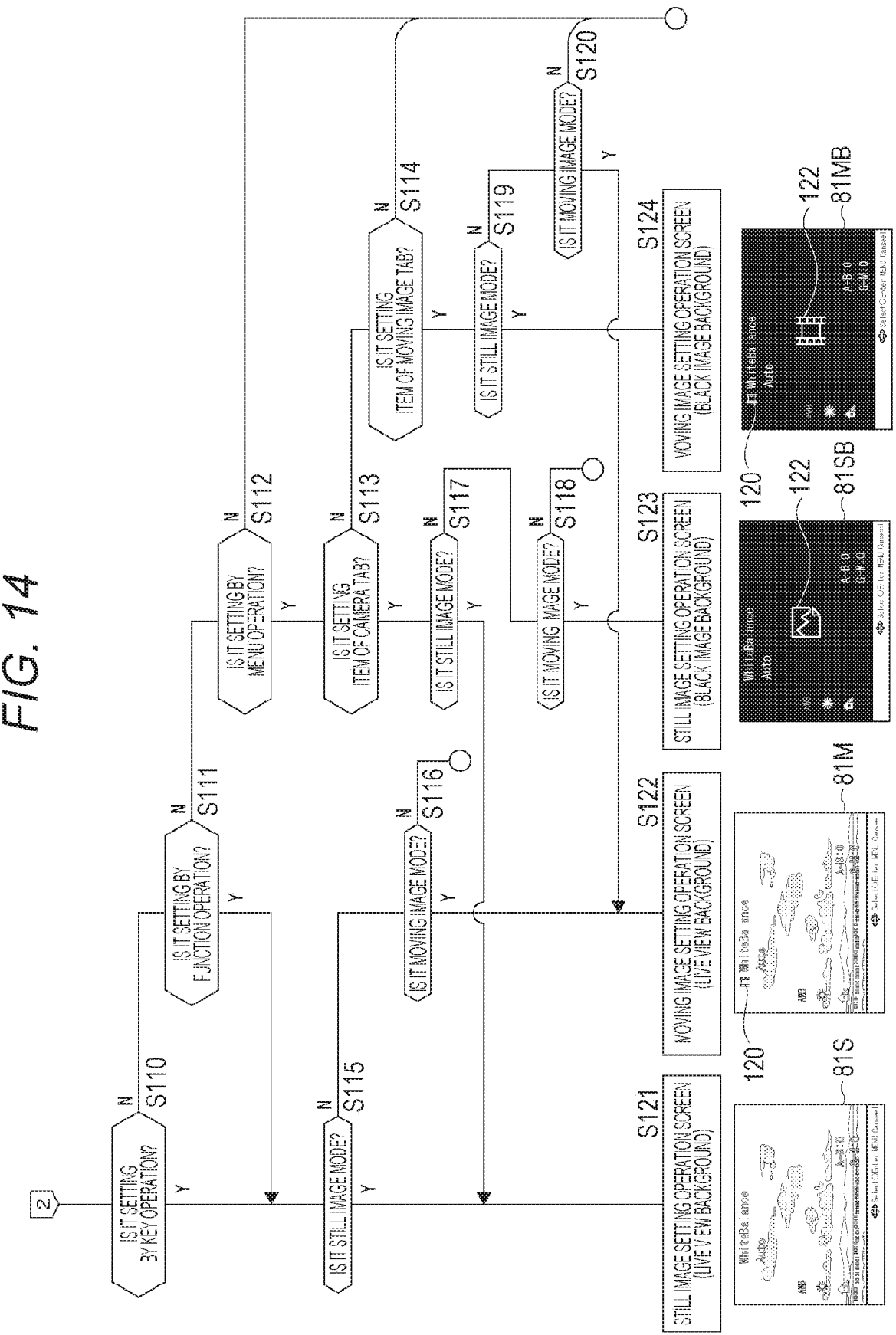
FIG. 14 is a flowchart of display control processing of the control unit according to an embodiment.
Figure 15:
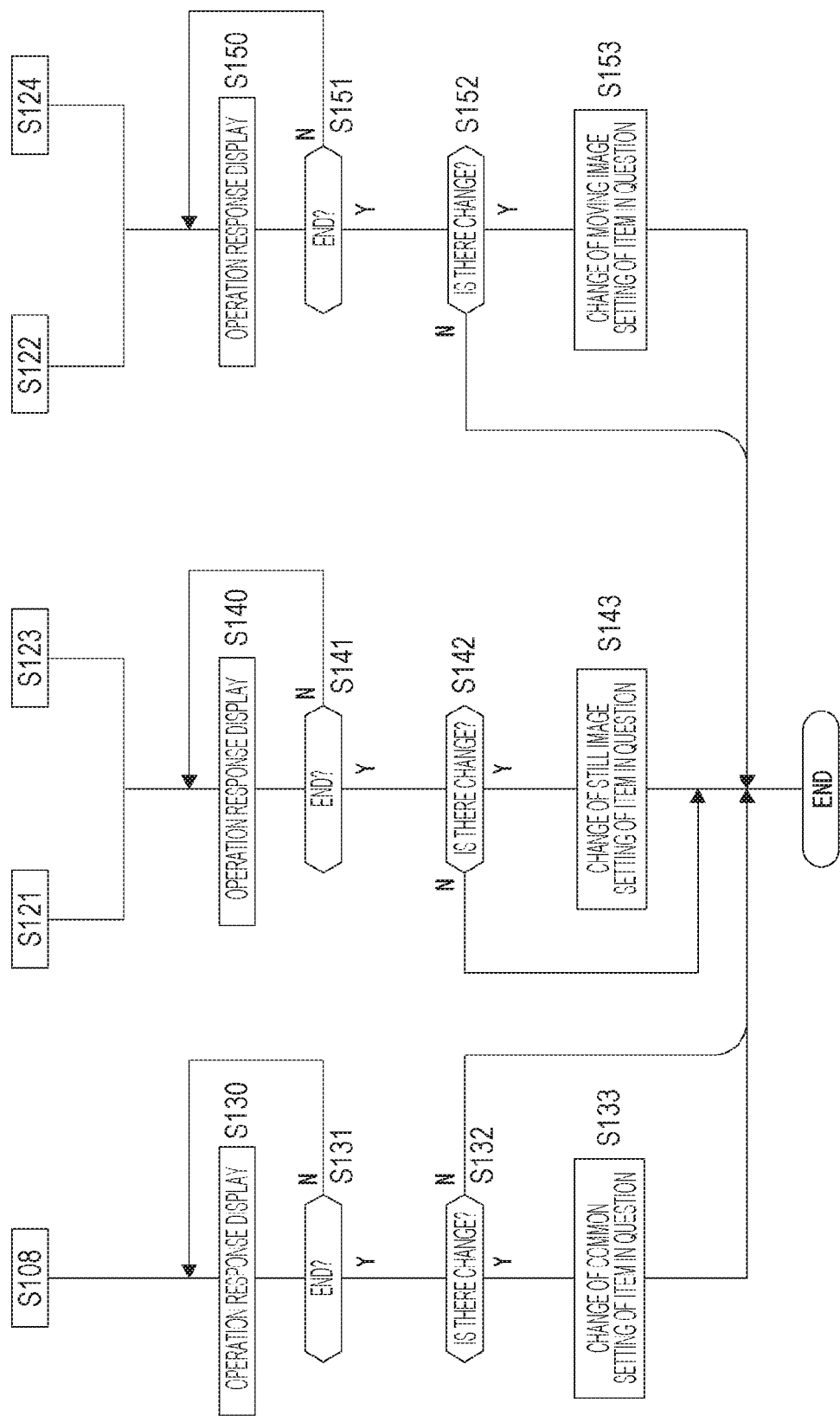
FIG. 15 is a flowchart of setting item storage processing of the control unit according to an embodiment.

FIGS. 13, 14, and 15 show processing of the control unit 30 in a case where the user performs a setting change operation of a certain setting item by the operation using the setting menu screen (camera tabs 50 and 60 or moving image tab 70) or the operation using the custom key 109 or function key 110.

When the selection operation for the setting item is detected, the control unit 30 proceeds from step S101 to step S102 in FIG. 13 and first confirms whether the setting item is common setting or independent setting.

In the case of common setting, the control unit 30 determines in steps S103, S104, S105, S106, and S107 how the selection operation of the setting item is performed.

In step S103, the control unit 30 confirms whether or not the selection operation of the setting item is performed by a key operation (operation of the custom key 109).

In step S104, the control unit 30 confirms whether or not the selection operation of the setting item is performed by an operation on the function screen 84 by the function key 110.

In step S105, the control unit 30 confirms whether or not the selection operation of the setting item is performed by an operation on the setting menu screen.

In the case of menu operation, the control unit 30 determines in steps S106 and S107 whether the operation is performed on the camera tabs 50 and 60 or the moving image tab 70.

In a case where none of the above operations apply, an error will occur.

Even when the setting item is selected by any of the above operations, in the case of common setting, the control unit 30 proceeds to step S108. Then, the setting operation screen common to still images and moving images is displayed. For example, it is a setting operation screen such as the illustrated WB setting operation screen 81, the above-described F-number/shutter speed setting operation screen 85, and the like.

Furthermore, in this case, a live view image is displayed on the background.

Note that, in the case of common setting, the processing proceeds to step S108 regardless of which operation is performed, and thus the processing of steps S103 to S107 is not necessarily required.

In a case where it has been confirmed in step S102 that the target setting item is independent setting, the control unit 30 determines in steps S110, S111, S112, S113, and S114 of FIG. 14 how the selection operation of the setting item has been performed.

In step S110, the control unit 30 confirms whether or not the selection operation of the setting item is performed by a key operation (operation of the custom key 109).

In a case where it is the operation of the custom key 109, in steps S115 and S116, it is confirmed whether the current mode is the still image imaging mode or the moving image imaging mode, and the processing diverges.

Then, in the still image imaging mode, the control unit 30 proceeds from step S115 to step S121 and displays the still image setting operation screen. For example, it is a setting operation screen such as the illustrated still image WB setting operation screen 81S, the above-described still image F-number/shutter speed setting operation screen 85S, and the like.

Furthermore, in this case, a live view image is displayed on the background.

On the other hand, when it is currently in the moving image imaging mode, the control unit 30 proceeds from step S116 to step S122 and displays the moving image setting operation screen. For example, it is a setting operation screen such as the illustrated moving image WB setting operation screen 81M, the above-described moving image F-number/shutter speed setting operation screen 85M, and the like.

Furthermore, in this case, a live view image is displayed on the background.

In a case where it is not the operation of the custom key 109, the control unit 30 proceeds from step S110 to step S111, and confirms whether or not the selection operation of the setting item is performed by an operation from the function screen 84 by the function key 110.

In the case of the operation from the function screen 84, the control unit 30 proceeds from step S111 to steps S115 and S116, confirms the current imaging mode similarly to the case of the above-described operation of the custom key 109, and proceeds to step S121 or S122.

In a case where the selection operation of the setting item is not performed by an operation from the function screen 84 by the function key 110, the control unit 30 proceeds from step S111 to step S112, and confirms whether or not the selection operation of the setting item is performed by an operation on the setting menu screen.

In the case of menu operation, the control unit 30 determines in steps S113 and S114 whether the operation is performed on the camera tabs 50 and 60 or the operation is performed on the moving image tab 70.

In a case where none of the above operations apply, an error will occur.

In a case where the selection operation of the setting item is the operation from the camera tabs 50 and 60, the control unit 30 proceeds from step S113 to steps S117 and S118, and confirms the current imaging mode.

Then, in the still image imaging mode, the control unit 30 proceeds from step S117 to step S121 and displays the still image setting operation screen.

On the other hand, when it is currently in the moving image imaging mode, the control unit 30 proceeds from step S118 to step S123 and displays the still image setting operation screen. For example, it is a setting operation screen such as the illustrated still image WB setting operation screen 81SB that clearly indicates an operation in an imaging mode different from the current one.

In this case, the background is a black image and the still image-dedicated setting icon 123 is displayed.

In a case where the selection operation of the setting item is the operation from the moving image tab 70, the control unit 30 proceeds from step S114 to steps S119 and S120, and confirms the current imaging mode.

Then, in the moving image imaging mode, the control unit 30 proceeds from step S120 to step S122 and displays the moving image setting operation screen.

On the other hand, when it is currently in the still image imaging mode, the control unit 30 proceeds from step S119 to step S124 and displays the moving image setting operation screen. For example, it is a setting operation screen such as the illustrated moving image WB setting operation screen 81MB that clearly indicates an operation in an imaging mode different from the current one.

In this case, the background is a black image and the moving image-dedicated setting icon 122 is displayed.

The control unit 30 performs display control of the setting operation screen of the setting item as described above.

The user can perform a desired setting change operation on the setting operation screen. The control unit 30 performs the processing of FIG. 15 in response to such a user operation.

In a case where the setting operation screen is displayed in step S108 of FIG. 13, the control unit 30 performs display control corresponding to the user operation in step S130 of FIG. 15. For example, the display control is performed such that the setting value is changed according to the user operation of selecting the setting value.

Then, when the user performs the operation of determining the setting value, the setting operation is ended in step S131, and it is confirmed in step S132 whether or not the setting value has been changed.

In a case where the user ends the operation particularly without changing the setting, the control unit 30 ends the processing related to the setting operation as it is.

In a case where the user has performed an operation of changing the setting value, the control unit 30 updates the setting value as common setting for the setting item to be processed in step S133. For example, the setting value as common setting of the setting item is updated in the flash memory 34.

In a case where the setting operation screen is displayed in step S121 or S123 of FIG. 14, the control unit 30 performs display control corresponding to the user operation in step S140 of FIG. 15. For example, the display control is performed such that the setting value is changed according to the user operation of selecting the setting value.

Then, when the user performs the operation of determining the set value, the setting operation is ended in step S141, and it is confirmed in step S142 whether or not the setting value has been changed.

In a case where the user ends the operation particularly without changing the setting, the control unit 30 ends the processing related to the setting operation as it is.

In a case where the user has performed an operation of changing the setting value, the control unit 30 updates the setting value corresponding to the still image imaging mode for the setting item to be processed in step S143. For example, the setting value for the still image imaging mode of the setting item is updated in the flash memory 34.

In a case where the setting operation screen is displayed in step S122 or S124 of FIG. 14, the control unit 30 similarly performs display control corresponding to the user operation in step S150 of FIG. 15.

Then, when the user performs the operation of determining the setting value, the setting operation is ended in step S151, and it is confirmed in step S152 whether or not the setting value has been changed.

In a case where the user ends the operation particularly without changing the setting, the control unit 30 ends the processing related to the setting operation as it is.

In a case where the user has performed an operation of changing the setting value, the control unit 30 updates the setting value corresponding to the moving image imaging mode for the setting item to be processed in step S153. For example, the setting value for the moving image imaging mode of the setting item is updated in the flash memory 34.

By performing the above processing, regarding various setting items, display according to common setting/independent setting, or management of setting values according to the user's setting change operation on the setting operation screen based on the display are properly performed.

<5. Application to Program and Computer Apparatus>

Although the embodiment of the imaging apparatus 10 has been described heretofore, the display control and the management of setting values described above can also be executed by various information processing apparatuses 200 by software.

That is, the information processing apparatus 200 separate from the imaging apparatus 10 can perform setting change operations of various setting items, and the information processing apparatus 200 separate from the imaging apparatus 10 can manage setting values of setting items of the imaging apparatus 10.

Then, by supplying such setting information to the imaging apparatus 10 by communication, it is also possible to operate the setting items using the information processing apparatus 200, for example.

The program of the embodiment is a program that causes, for example, a CPU, a DSP, or the like, or the information processing apparatus 200 shown in FIG. 1, which is a device including them, to execute the processing of FIGS. 13 and 14 shown in the above-described embodiment.

That is, the program of the embodiment causes the information processing apparatus 200 to execute the processing of controlling the display mode of the setting operation screen for operating the setting items so that the setting operation screen common to a plurality of imaging modes is displayed regardless of imaging mode regarding setting items of common setting to be commonly controlled in the plurality of imaging modes among setting items related to imaging of the imaging apparatus. Furthermore, the program causes the information processing apparatus 200 to execute the processing of controlling the display mode of the setting operation screen such that different setting operation screens are displayed depending on an imaging mode regarding setting items of independent setting independently controlled with respect to each imaging mode among setting items related to imaging.

With such a program, the information processing apparatus 200 that performs the above-described display control can be achieved. That is, the above-described display control can also be achieved in the information processing apparatus 200, which is separate from the imaging apparatus 10.

Furthermore, the program of the embodiment is also a program that causes the information processing apparatus 200 to execute the processing of FIG. 15 described in the above embodiment.

That is, the program of the embodiment causes the information processing apparatus 200 to execute the processing of updating the memory of common setting values for a plurality of imaging modes according to a setting change operation in a case where common setting is selected for the setting item of an operation target regarding setting items related to imaging in the plurality of imaging modes.

Furthermore, in a case where independent setting for each imaging mode is selected regarding a setting item of an operation target, the program causes the information processing apparatus 200 to execute the processing of updating the memory of the setting value of the imaging mode of the operation target in response to the setting change operation of the imaging mode of the operation target.

With such a program, the information processing apparatus 200 that manages the above-described setting values can be achieved. That is, the above-described setting management control can be achieved in the information processing apparatus 200, which is separate from the imaging apparatus 10.

Such a program can be recorded in advance in a HDD, which is a recording medium built in a device such as a computer apparatus, or a ROM in a microcomputer having a CPU, and the like.

Alternatively, furthermore, it can be temporarily or permanently stored (recorded) in a removable recording medium including a flexible disc, a compact disc read only memory (CD-ROM), a magneto optical (MO) disc, a digital versatile disc (DVD), a Blu-ray disc (registered trademark), a magnetic disc, a semiconductor memory, a memory card, or the like. Such a removable recording medium can be provided as so-called package software.

Furthermore, such a program can be installed from a removable recording medium into a personal computer or the like, or can be downloaded from a download site via a network such as a local area network (LAN) or the Internet.

Furthermore, such a program is suitable for providing a wide range of the information processing apparatuses 200 of the embodiment. For example, by downloading the program to a personal computer, a portable information processing apparatus, a mobile phone, a game device, a video device, a personal digital assistant (PDA), or the like, the personal computer or the like can be the information processing apparatus 200 of the present disclosure.

Figure 16:
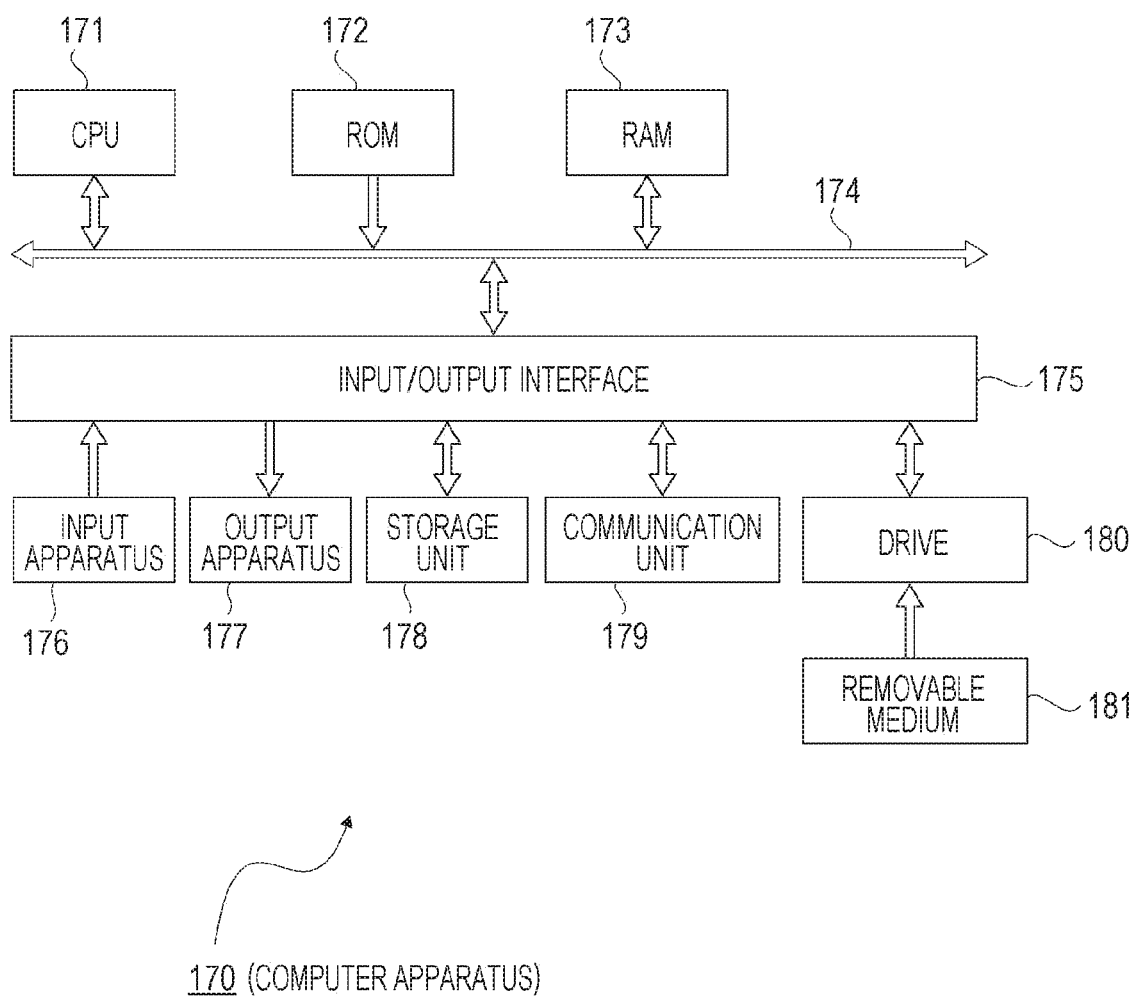
FIG. 16 is a block diagram of a computer apparatus according to an embodiment.

For example, the information processing apparatus 200 can be achieved in a computer apparatus 170 as shown in FIG. 16.

In FIG. 16, a CPU 171 of the computer apparatus 170 executes various processing according to a program stored in a ROM 172 or a program loaded from a storage unit 178 to a RAM 173. Data or the like required for the CPU 171 to execute various processing are also stored in the RAM 173 as appropriate.

The CPU 171, the ROM 172, and the RAM 173 are connected to each other via a bus 174. An input/output interface 175 is also connected to the bus 174.

The input/output interface 175 is connected to an input unit 176 including a keyboard, a mouse, and the like, an output unit 177 including a display including an LCD, an organic EL panel, or the like, and a speaker and the like, the storage unit 178 including a hard disk and the like, and a communication unit 179 including a modem and the like. The communication unit 179 performs communication processing via a network including the Internet.

A drive 180 is also connected to the input/output interface 175 as necessary, a removable medium 181 such as a magnetic disk, an optical disk, a magneto-optical disk, or a semiconductor memory is appropriately mounted, and a computer program read from them is installed in the storage unit 178 as necessary.

In a case where the display control processing and the setting value management processing described above are executed by software, a program constituting the software is installed from a network or a recording medium.

This recording medium includes the removable medium 181 including a magnetic disk, an optical disk, a magneto-optical disk, a semiconductor memory, or the like on which the program is recorded, which is distributed to distribute the program to the user. Alternatively, it also includes the ROM 172 in which a program is recorded or a hard disk included in the storage unit 178, which is distributed to the user in a state of being incorporated in the apparatus body in advance, for example.

In such a computer apparatus 170, when moving image data is input by the receiving operation by the communication unit 179, the reproducing operation by the drive 180 (removable medium 181) or the storage unit 178, or the like, the CPU 171 can execute the processing of FIGS. 13, 14 and 15 described above on the basis of the program.

<6. Summary and Variation>

The following effects can be obtained in the present embodiment described above.

The imaging apparatus 10 according to the embodiment includes the control unit 30 (display control unit 30c) for controlling the display mode of the setting operation screen for performing an operation of a setting item depending on whether the setting item related to imaging is common setting that is commonly controlled for a plurality of imaging modes or independent setting that is independently controlled for each imaging mode. Then, in a case where the setting item is common setting, the display control unit 30c performs control to display the common setting operation screen for a plurality of imaging modes regardless of the imaging mode, and in a case where the setting item is independent setting, the display control unit 30c performs control to display different setting operation screens depending on the imaging mode.

That is, for various setting items of the imaging apparatus 10, it is possible to switch between common setting and independent setting in a plurality of imaging modes, and in the case of common setting, the display mode of the setting operation screen is not changed depending on the imaging mode. On the other hand, in the case of independent setting, the display mode of the setting operation screen is changed depending on the imaging mode.

In the present embodiment described above, first, for various setting items of the imaging apparatus, common setting and independent setting can be switched in a plurality of imaging modes such as the still image imaging mode and the moving image imaging mode of the embodiment. Thus, it is possible for the user to set in advance a suitable setting for each item whose setting is to be changed in each imaging mode.

For example, when the white balance is independent setting and a setting value is selected according to the imaging mode, a still image setting (e.g., auto white balance)

is obtained in the still image imaging mode, and a moving image setting (e.g., sunlight) is obtained in the moving image imaging mode.

As a result, for example, when switching between moving image imaging and still image imaging, no troublesome setting change is required, and imaging can be carried out very smoothly.

In the case of common setting, the display mode of the setting operation screen is not changed depending on the imaging mode (for example, the WB setting operation screen 81), so that the user can naturally recognize the common setting. Furthermore, in the case of independent setting, the display mode of the setting operation screen is changed depending on the target imaging mode (for example, the still image WB setting operation screen 81S and the moving image WB setting operation screen 81M), so that the user can recognize that the setting operation of an item of independent setting is performed and it is possible to perform an appropriate operation. Furthermore, the independent setting operation becomes easy to understand.

Note that enabling the independent setting depending on the imaging mode of the embodiment has a different meaning from so-called registration of custom setting.

The custom setting mentioned here is a function that allows the user to set and register a predetermined value for one or more arbitrary setting items such as, for example, shutter speed, F-number, and white balance. For example, by assigning a custom setting to a predetermined button or the like, the user can call up the registered setting by one-touch operation. In this way, it is possible to switch to the "custom setting" state without making a troublesome setting change.

However, this is not the setting linked to the imaging mode as in the present embodiment. Therefore, there are the following differences.

In the present embodiment, the normal setting is assigned to the imaging mode. Therefore, the independent setting according to the imaging mode is effective according to the switching of the imaging mode. The custom setting does not correspond to such an imaging mode.

Furthermore, since the settings of the embodiment are normal settings, in a case where a certain setting is changed in a certain imaging mode, the change is valid until later. For example, in a case where the F-number is changed in the moving image imaging mode, the change becomes valid in the moving image imaging mode thereafter. That is, when the setting is changed, it is valid until next setting change. That is, the setting can be changed at any time, and the changed setting is linked to the imaging mode.

On the other hand, even when the setting of the custom setting is changed after calling it, until a re-registration operation is performed, the content of the setting change is not stored as the custom setting. Therefore, the setting change is not reflected on the next custom setting calling. The custom setting is suitable for storing specific settings.

In this way, the independent setting for each imaging mode of the present embodiment is different from the custom setting and can provide usability different from the custom setting. Then, in particular, at the occasion of switching between still image imaging and moving image imaging, it is a function that enables very efficient operation.

In the imaging apparatus 10 of the embodiment, the control unit 30 performs control so that a selection operation screen (moving image independent setting item screen 71) that allows selection of common setting or independent setting for each setting item is displayed.

The setting items that commonly exist in the plurality of imaging modes may be common setting or independent setting. Therefore, these items are displayed, for example, as a list display so that the user can select common setting and independent setting eye for each item.

As a result, it becomes possible to select common setting/independent setting according to the individual usage mode of the user. For example, it is only required for the user to set an item whose setting is switched between the moving image imaging mode and the still image imaging mode as an independent setting item.

By setting the item whose setting is changed in the moving image imaging mode or the still image imaging mode to independent setting, the user does not have to perform the setting change operation when switching the imaging mode.

On the other hand, by setting the item that does not particularly require a setting change to common setting, it is not necessary to perform a setting change operation separately for each imaging mode, which also improves the operability.

Note that, in the embodiment, each setting item is common setting in the initial state. By doing so, the imaging apparatus 10 including the moving image tab 70 can be used with the usability similar to that of a conventional model. Therefore, the operability is favorable for the user.

In the embodiment, the control unit 30 is configured to perform display indicating common setting or independent setting on the setting menu screen displaying the setting items.

For example, in the example of FIG. 7, the moving image-dedicated setting icon 120 is displayed for the white balance setting item on the moving image tab 70, clearly indicating that the setting corresponds to the moving image imaging mode.

Regarding the item of independent setting, the still image-dedicated setting icon 121 may be displayed on the camera tab 50 as shown in FIG. 8.

By making common setting/independent setting visible on the setting menu screen as described above, it is possible to provide a user-friendly setting item menu.

In the embodiment, the control unit 30 performs control to perform display of distinguishing a corresponding imaging mode in a case where at least the setting operation screen of the setting item of independent setting is displayed.

In the example of FIG. 7, the moving image-dedicated setting icon 120 is displayed on the moving image WB setting operation screen 81M to enable distinguishing from the still image WB setting operation screen 81S.

Furthermore, in the example of FIG. 8, the moving image-dedicated setting icon 120 is displayed on the moving image WB setting operation screen 81M, and the still image-dedicated setting icon 121 is displayed on the still image WB setting operation screen 81S to enable distinction.

By adding the identification display as described above, the user can clearly know on which imaging mode the setting operation is performed on the setting operation screen, and can avoid confusion of the operation.

In the embodiment, in a case where the operation related to the change of the setting item is performed while the screen generated by imaging is displayed (for example, live view image display), the control unit 30 provides a display mode in which the display of the screen generated by imaging is different depending on whether the target setting item is common setting or independent setting.

For example, the setting operation screen of the setting item can be called by various operations in the state where the live view is displayed as described in FIG. 7 and the like.

In this case, the display mode is changed depending on whether the designated setting item is common setting or independent setting.

Therefore, the user can perform a desired setting change operation while being able to understand common setting/ independent setting on the setting operation screen.

For example, in the example of FIG. 7, the moving image-dedicated setting icon 120 is displayed on the moving image WB setting operation screen 81M to enable distinguishing from the still image WB setting operation screen 81S.

Furthermore, in the example of FIG. 8, the moving image-dedicated setting icon 120 is displayed on the moving image WB setting operation screen 81M, and the still image-dedicated setting icon 121 is displayed on the still image WB setting operation screen 81S to enable distinction.

On the other hand, in the case of common setting, the common display mode is provided as shown in FIG. 6.

For example, the display according to common setting/ independent setting is performed including the case of the transition by the custom key and the transition by the function operation, and the content of the setting operation (common setting or independent setting) is prevented from confusing the user.

Regarding the setting item of independent setting, the control unit 30 of the embodiment performs control of providing display modes having different setting operation screens between a case where an operation for giving an instruction on a setting operation of one imaging mode for the setting item is performed in the one imaging mode and a case where an operation for giving an instruction on a setting operation of one imaging mode for the setting item is performed in another imaging mode.

For example, in the example of FIG. 7, live view display is not performed on the setting operation screen (81SB, 81MB) for the imaging mode different from the current imaging mode, and the moving image-dedicated setting icon 122 or the still image-dedicated setting icon 123 is largely displayed.

Therefore, the user can clearly understand whether the setting operation of the current imaging mode is performed or the setting operation of an imaging mode that is not the current imaging mode is performed. This can prevent confusion of operation.

In particular, stopping live view and setting the background to black, for example, on the setting operation screen (81SB, 81MB) is a strong appeal that it is not in the current imaging mode, and by largely displaying the moving image-dedicated setting icon 122 or the still image-dedicated setting icon 123, it is possible to clearly give notice of the imaging mode for which a setting change is performed.

The control unit 30 of the embodiment at least displays, as a setting menu screen, the first tab (for example, the camera tabs 50 and 60) including the setting items corresponding to the first imaging mode, and the second tab (for example, the moving image tab 70) including the setting items corresponding to the second imaging mode.

That is, the setting items corresponding to the first imaging mode and the setting items corresponding to the second imaging mode are displayed on different tabs (camera tabs 50 and 60 and moving image tab 70).

As a result, the setting items for each imaging mode are provided on the menu in an easy-to-understand manner.

In particular, by providing tabs corresponding to the imaging mode such as the camera tabs 50 and 60 and the moving image tab 70 of the embodiment, usability is improved. That is, the user can understand that the setting items for still image imaging are searched for in the camera tabs 50 and 60, and the setting items for moving image imaging are searched for in the moving image tab 70.

Furthermore, the user of the imaging apparatus 10 includes people who use the imaging apparatus 10 only for still image imaging and people who use the imaging apparatus 10 only for moving image imaging. A person who uses the imaging apparatus 10 only for still image imaging is only required to search the camera tab 50, and a person who uses the imaging apparatus 10 only for moving image imaging is only required to search the moving image tab 70. Therefore, the searchability of the setting items is improved and the usability is improved.

The control unit 30 of the embodiment, in a case where an instruction on an operation of the setting item included in both the first tab and the second tab is given, in a case where the setting item is common setting, regardless of the imaging mode, performs control such that the setting operation screen common to a plurality of imaging modes is displayed, and in a case where the setting item is independent setting, performs control such that a different setting operation screen is displayed depending on the imaging mode.

For example, the same setting item is included in different tabs (camera tabs 50 and 60 and moving image tab 70) as the setting item corresponding to the still image imaging mode and the setting item corresponding to the moving image imaging mode. In a case where the selected setting item is common setting, the screen transitions to the same setting operation screen regardless of on which tab the setting item is selected.

In a case where the selected setting item is independent setting, the screen transitions to the setting operation screen according to the still image imaging mode in a case where the setting item of the camera tab 50 or 60 is selected, and the screen transitions to the setting operation screen according to the moving image imaging mode in a case where the setting item of the moving image tab 70 is selected.

By providing the tab for each imaging mode in this way, the transition of the setting operation screen of the setting item becomes easy to understand.

For example, in a case where the white balance is common setting, even in a case where the white balance setting item is selected on either the camera tab 50 or the moving image tab 70, the screen transitions to the common WB setting screen 81. Therefore, the user can perform the operation without being particularly aware of the tab or the imaging mode. On the other hand, in the case of independent setting, in a case where the white balance setting item is selected on the camera tab 50, the screen transitions to the still image WB setting operation screen 81S (or 81SB). Furthermore, in a case where the white balance setting item is selected on the moving image tab 70, the screen transitions to the moving image WB setting operation screen 81M (or 81MB). Therefore, the user can perform an operation while grasping the settings for still images/moving images with the tabs, there is no confusion of the operation contents, and the operability becomes favorable.

The control unit 30 of the embodiment, regarding the setting item at least included in both the first tab and the second tab, the setting item being independent setting, performs display for distinguishing that the setting item of the first tab and the setting item of the second tab correspond to the first imaging mode and the second imaging mode.

In the example of FIG. 7, the moving image-dedicated setting icon 120 is displayed for the white balance setting item on the moving image tab 70, clearly indicating that the setting corresponds to the moving image imaging mode.

In the example of FIG. 8, the still image-dedicated setting icon 121 is also displayed for the setting item of white balance on the camera tab 50.

By adding the icon display as described above, the user can understand that the setting item displayed on each tab is independent setting and the corresponding imaging mode. This makes the operation easier to understand. Furthermore, a menu in which common setting/independent setting is easy to understand for setting items will be provided.

The control unit 30 of the embodiment, at least regarding the setting item included in both the first tab and the second tab, the setting item being independent setting, performs control of providing different display modes in a case where the setting item of the second tab is specified in the first imaging mode and in a case where the setting item of the second tab is specified in the second imaging mode.

For example, in the example of FIG. 7, live view display is not performed on the setting operation screen (81SB, 81MB) of a different imaging mode, and the moving image-dedicated setting icon 122 or the still image-dedicated setting icon 123 is largely displayed.

Therefore, the user can clearly understand whether the setting operation of the current imaging mode is performed or the setting operation of an imaging mode that is not the current imaging mode is performed. This can prevent confusion of operation.

It is assumed that the plurality of imaging modes of the imaging apparatus 10 of the embodiment includes the still image imaging mode and the moving image imaging mode.

That is, for various setting items, common setting and independent setting can be switched in the still image imaging mode and the moving image imaging mode.

Various setting items of the imaging apparatus can be switched between common setting and independent setting in the still image imaging mode and the moving image imaging mode, so that the user can suitably preset the items whose setting is to be changed at the time of still image imaging and moving image imaging. As a result, for example, when switching between moving image imaging and still image imaging, no troublesome setting change is required, and imaging can be carried out very smoothly.

Note that the imaging mode to which independent setting is applied is not limited to the still image imaging mode and the moving image imaging mode. That is, in a case where the imaging mode to which independent setting is applied is a plurality of imaging modes relating to still image imaging, the imaging apparatus 10 may not have the moving image imaging mode, and conversely, in the case of a plurality of imaging modes relating to moving image imaging, the imaging apparatus 10 may not have the still image imaging mode.

The imaging modes include a panoramic imaging mode, a high frame rate moving image imaging mode, a continuous shooting mode, a long-exposure imaging mode, and the like. With respect to various setting items, independent setting corresponding to these imaging modes can also be applied.

Furthermore, moreover, the following imaging modes are available.

Auto mode: A mode that is automatically set to a value that is determined to be appropriate, and enables easy imaging regardless of a subject or environments.

Program auto mode: A mode in which the exposure (shutter speed and aperture) is set automatically, but other settings can be adjusted by the user.

Aperture priority mode: A mode that sets the aperture value and captures an image when, for example, a blurred background is wanted.

Shutter speed priority mode: A mode in which the shutter speed is set and an image is captured when, for example, a fast-moving subject is captured.

Manual exposure mode: A mode in which the exposure (shutter speed and aperture) is adjusted and an image is captured with the desired exposure.

Registration calling mode: A mode in which a frequently used mode or numerical setting that is preliminarily registered is called and an image is captured.

Moving image/slow & quick motion mode: A mode in which an exposure mode for moving image imaging or slow motion/quick motion imaging can be set and a moving image is captured.

Swing panorama mode: A mode in which images can be combined to capture a panoramic image.

Scene selection mode: A mode in which when a mode is selected that is suitable for a subject to be captured or environments, an image can be captured with the setting suitable for the subject.

In these modes, common setting/independent setting can be applied to various setting items, and display control and setting value management according to the embodiment can also be performed.

The program auto mode, aperture priority mode, shutter speed priority mode, manual exposure mode, and the like described above can also be applied to moving images. The technology of the present embodiment can be applied to these moving image imaging modes.

In the embodiment, as the setting items that can be selected to be common setting and independent setting, an example of the setting items that affect the captured image acquired by imaging has been described.

With regard to such settings that affect captured images, there are many occasions where they are switched depending on the imaging mode, and therefore it would be convenient when the independent setting can be selected.

Furthermore, as the setting items that can be selected to be common setting and independent setting, an example of the setting items that affect the display of a screen generated by imaging has been described.

Similarly, with regard to such settings that affect display of captured images, there are many occasions where they are switched depending on the imaging mode, and therefore it would be convenient when the independent setting can be selected.

Furthermore, as the setting items that can be selected to be common setting and independent setting, an example of the setting items relating to the imaging operation has been described.

When the setting relating to these imaging operations can be independent setting, different operation modes can be called according to the imaging mode, which can greatly improve the operability.

The imaging apparatus 10 according to the embodiment includes the control unit 30 (setting management unit 30b) that can selectively execute whether to store the setting item related to imaging as common setting that is commonly controlled for a plurality of imaging modes or to store the setting item related to imaging as independent setting that is independently controlled for each imaging mode.

The setting management unit 30b, in a case where the common setting is selected regarding the setting item of the operation target, updates the memory of the common setting value for a plurality of imaging modes according to the setting change operation. Furthermore, in a case where the independent setting for each imaging mode is selected regarding the setting item of the operation target, the memory of the setting value regarding the imaging mode of the operation target is updated in response to the setting change operation of the imaging mode of the operation target.

Therefore, even in a case where common setting and independent setting are selected for various setting items of the imaging apparatus 10 in a plurality of imaging modes such as the still image imaging mode and the moving image imaging mode in the embodiment, the setting information can be appropriately managed.

The technology of the present embodiment is not limited to the examples of the embodiment, but various variations are possible.

In the above example, the example is described in which the display mode is changed using the icon (moving image-dedicated setting icons 120 and 122, and the still image-dedicated setting icons 121 and 123) or the background image (for example, live view image, black background, or the like) on each screen. However, of course, it is not limited thereto, but various examples in which the display mode is changed are possible.

For example, various specific methods for changing the display mode are conceivable such as addition of various icons or character images, screen color, image effects such as highlight and blur, and blinking display.

Furthermore, in the above example, the user can select common setting/independent setting for the setting items, but the processing in which a learning function is provided and independent setting is automatically selected to some extent is also possible.

For example, in a case where the user changes the setting in the case of the still image imaging mode and in the case of the moving image imaging mode, the control unit stores the setting item and the setting value. Furthermore, the control unit analyzes each of the still image and the moving image at that time, and also determines what kind of scene was captured.

Then, for example, for the same type of scene, it is possible to detect the setting item whose setting is changed for a still image and a moving image.

In such a case, it is also conceivable that the control unit automatically sets the setting item as independent setting and registers the setting values in the still image imaging mode and the moving image imaging mode as the setting values of the independent setting.

Furthermore, the present embodiment exemplifies the control according to common setting/independent setting for the setting items regarding the plurality of imaging modes with regard to one imaging apparatus 10, but it is not limited thereto.

For example, the present technology can also be applied to the case where, with regard to setting items related to imaging of a plurality of imaging apparatuses, control is performed depending on either common setting/independent setting as to whether the setting items are commonly set in the plurality of imaging apparatuses or the setting items are independently set with respect to each imaging apparatus of the plurality of imaging apparatuses.

Furthermore, the present technology is not limited to the setting items related to imaging, but can also be applied to the case where control is performed depending on either common setting/independent setting as to whether other setting items (for example, font size, format, and color) are commonly set between a plurality of applications installed in a mobile phone or other setting items are independently set with respect to each of the plurality of applications, for example.

Note that the effects described in the present description are merely illustrative and are not limitative, and other effects may be provided.

Note that the present technology may adopt the configuration described below.

(1)

An imaging apparatus including:

a display control unit that controls a display mode of a setting operation screen that performs an operation of a setting item depending on whether a setting item related to imaging is common setting that is commonly controlled for a plurality of imaging modes or the setting item is independent setting that is independently controlled for each imaging mode, in which the display control unit, in a case where the setting item is the common setting, regardless of the imaging mode, performs control to display the setting operation screen common to the plurality of imaging modes, and in a case where the setting item is the independent setting, performs control to display a different setting operation screen depending on the imaging mode.

(2)

The imaging apparatus according to (1), in which the display control unit performs control to display a selection operation screen on which each setting item can be selected to be the common setting or the independent setting.

(3)

The imaging apparatus according to (1) or (2), in which the display control unit performs control to perform display indicating the common setting or the independent setting on a setting menu screen that displays the setting item.

(4)

The imaging apparatus according to any of (1) to (3), in which the display control unit performs control to perform display of distinguishing a corresponding imaging mode in a case where at least the setting operation screen of the setting item of the independent setting is displayed.

(5)

The imaging apparatus according to any of (1) to (4), in which the display control unit, in a case where an operation related to the setting item is performed while a screen generated by imaging is displayed, performs control to provide a display mode in which display of the screen generated by imaging is different depending on whether the target setting item is the common setting or the independent setting.

(6)

The imaging apparatus according to any of (1) to (5), in which the display control unit, regarding the setting item of the independent setting, performs control of providing a display mode in which the setting operation screen is different between a case where an operation for giving an instruction on a setting operation of one imaging mode for the setting item is performed in the one imaging mode and a case where an operation for giving an instruction on a setting operation of one imaging mode for the setting item is performed in another imaging mode.

(7)

The imaging apparatus according to any of (1) to (6), in which the display control unit at least displays, as a setting menu screen, a first tab including a setting item corresponding to a first imaging mode, and a second tab including a setting item corresponding to a second imaging mode.

(8)

The imaging apparatus according to (7), in which the display control unit, in a case where an instruction on an operation of the setting item included in both the first tab and the second tab is given, in a case where the setting item is the common setting, regardless of the imaging mode, performs control such that a setting operation screen common to the plurality of imaging modes is displayed, and in a case where the setting item is the independent setting, performs control such that a different setting operation screen is displayed depending on the imaging mode.

(9)

The imaging apparatus according to (7) or (8), in which the display control unit, regarding the setting item at least included in both the first tab and the second tab, the setting item being the independent setting, performs display for distinguishing that the setting item of the first tab and the setting item of the second tab correspond to the first imaging mode and the second imaging mode.

(10)

The imaging apparatus according to any of (7) to (9), in which the display control unit, regarding the setting item at least included in both the first tab and the second tab, the setting item being the independent setting, performs control of providing different display modes in a case where the setting item of the second tab is specified in the first imaging mode and in a case where the setting item of the second tab is specified in the second imaging mode.

(11)

The imaging apparatus according to any of (1) to (10), in which the plurality of imaging modes includes a still image imaging mode and a moving image imaging mode.

(12)

The imaging apparatus according to any of (1) to (11), in which as the setting item that can be selected to be the common setting and the independent setting, a setting item that affects a captured image acquired by imaging is included.

(13)

The imaging apparatus according to any of (1) to (12), in which as the setting item that can be selected to be the common setting and the independent setting, a setting item that affects display of a screen generated by imaging is included.

(14)

The imaging apparatus according to any of (1) to (13), in which as the setting item that can be selected to be the common setting and the independent setting, a setting item related to an imaging operation is included.

(15)

An imaging apparatus including:

a setting management unit that can selectively execute whether to store a setting item related to imaging as common setting that is commonly controlled for a plurality of imaging modes or to store the setting item related to imaging as independent setting that is independently controlled for each imaging mode, in which the setting management unit, in a case where the setting item of an operation target is selected to be the common setting, updates memory of a setting value common to the plurality of imaging modes according to a setting change operation, and in a case where the setting item of the operation target is selected to be the independent setting, updates memory of a setting value of an imaging mode of the operation target according to a setting change operation of the imaging mode of the operation target.

(16)

A display control method of an imaging apparatus, the display control method including:

regarding a setting item of common setting that is commonly controlled for a plurality of imaging modes among setting items related to imaging, controlling a display mode of a setting operation screen that performs an operation of a setting item such that a setting operation screen common to the plurality of imaging modes is displayed regardless of the imaging mode; and regarding a setting item of independent setting that is independently controlled for each imaging mode among the setting items related to imaging, controlling a display mode of the setting operation screen such that a different setting operation screen is displayed according to the imaging mode.

(17)

A program that causes an information processing apparatus to execute:

processing of controlling a display mode of a setting operation screen that performs an operation of a setting item such that a setting operation screen common to a plurality of imaging modes is displayed regardless of the imaging mode regarding a setting item of common setting that is commonly controlled for the plurality of imaging modes among setting items related to imaging by an imaging apparatus; and processing of controlling a display mode of the setting operation screen such that a different setting operation screen is displayed according to the imaging mode regarding a setting item of independent setting that is independently controlled for each imaging mode among the setting items related to imaging.

REFERENCE SIGNS LIST

1 Housing
2 Display panel
3 Viewfinder
4 Lens barrel
10 Imaging apparatus
11 Optical system
12 Imager
13 Optical system drive unit
14 Sensor unit
15 Storage unit
16 Communication unit
20 Digital signal processing unit
21 Preprocessing unit
22 Synchronization unit
23 YC generation unit
24 Resolution conversion unit
25 Codec unit
26 Display data generation unit 27 Image analysis unit
28 Focus processing unit
30 Control unit
30a Imaging control unit
30b Setting management unit
30c Display control unit
30d Recording/reproduction control unit
30e Communication control unit
30f Input detection unit
31 CPU
32 ROM
33 RAM
34 Flash memory
35 Operation unit
36 Display unit
50, 60 Camera tab
70 Moving image tab
71 Moving image independent setting item screen
81 WB setting operation screen
81S, 81SB Still image WB setting operation screen
81M, 81MB Moving image WB setting operation screen
82 Still image imaging mode screen
83 Moving image imaging mode image
84 Function screen
85 F-number/shutter speed setting screen
85S Still image F-number/shutter speed setting screen
85M Moving image F-number/shutter speed setting screen
120, 122 Moving image-dedicated setting icon
121, 123 Still image-dedicated setting icon

The invention claimed is:

1. An imaging apparatus, comprising:
a Central Processing Unit (CPU) configured to:
control display of a first tab and a second tab, wherein each of the first tab and the second tab includes a setting item;
control display of a selection operation screen which includes a user selectable option for selection of the setting item as one of a common setting or an independent setting, wherein
the setting item is related to an imaging operation,
the common setting is commonly controlled for a plurality of imaging modes of the imaging apparatus, and
the independent setting is independently controlled for each imaging mode of the plurality of imaging modes;
control, in a case where the setting item is selected as the common setting, display of a first setting operation screen common to the plurality of imaging modes regardless of a current imaging mode of the imaging apparatus, wherein
the display of the first setting operation screen is controlled based on an instruction on an operation of the setting item included in both the first tab and the second tab, and
the first setting operation screen is configured to execute an operation of the setting item; and
control display of a second setting operation screen in a case where the setting item is selected as the independent setting, wherein
the display of the second setting operation screen is controlled based on the current imaging mode, and
the second setting operation screen is different from the first setting operation screen.

2. The imaging apparatus according to claim 1, wherein the CPU is further configured to control display of an icon indicating one of the common setting or the independent setting on a setting menu screen configured to display the setting item.

3. The imaging apparatus according to claim 1, wherein the CPU is further configured to control display of an icon that distinguishes a corresponding imaging mode based on display of the second setting operation screen of the independent setting.

4. The imaging apparatus according to claim 1, wherein the CPU is further configured to:
display a screen generated based on the imaging; and
based on an operation related to a target setting item on the displayed screen, control display of a first display mode in which display of the displayed screen is different based on whether the target setting item is the common setting or the independent setting.

5. The imaging apparatus according to claim 1, wherein based on the setting item is the independent setting, the CPU is further configured to control display of a second display mode in which the second setting operation screen is different between a first case and a second case, wherein
in the first case, an operation to give an instruction on a setting operation of a first imaging mode for the setting item is performed in the first imaging mode,
in the second case, the operation to give the instruction on the setting operation of the first imaging mode for the setting item is performed in a second imaging mode, and
the plurality of imaging modes includes the first imaging mode and the second imaging mode.

6. The imaging apparatus according to claim 1, wherein the CPU is further configured to control display of the first tab and the second tab as a setting menu screen, wherein
the setting item of the first tab corresponds to a first imaging mode of the plurality of imaging modes, and
the setting item of the second tab corresponds to a second imaging mode of the plurality of imaging modes.

7. The imaging apparatus according to claim 6, wherein based on the setting item is the independent setting, the CPU is further configured to control display of an icon to distinguish that the setting item of the first tab corresponds to the first imaging mode and the setting item of the second tab corresponds to the second imaging mode.

8. The imaging apparatus according to claim 6, wherein based on the setting item is the independent setting, the CPU is further configured to control display of different display modes in a first case and a second case,
in the first case, the setting item of the second tab is specified in the first imaging mode, and
in the second case, the setting item of the second tab is specified in the second imaging mode.

9. The imaging apparatus according to claim 1, wherein the plurality of imaging modes includes a still image imaging mode and a moving image imaging mode.

10. The imaging apparatus according to claim 1, wherein a setting item that affects a captured image acquired by the imaging is selectable as the common setting and the independent setting.

11. The imaging apparatus according to claim 1, wherein a setting item that affects display of a screen generated based on the imaging is selectable as the common setting and the independent setting.

12. An imaging apparatus, comprising:
a Central Processing Unit (CPU) configured to:
control display of a first tab and a second tab, wherein each of the first tab and the second tab includes a setting item;

control display of a selection operation screen which includes a user selectable option for selection of the setting item as one of a common setting or an independent setting, wherein
the setting item is related to an imaging operation,
the common setting is commonly controlled for a plurality of imaging modes of the imaging apparatus, and
the independent setting is independently controlled for each imaging mode of the plurality of imaging modes; and
control selective storage of the setting item as the common setting or as the independent setting, wherein
in a case where the setting item of an operation target is selected as the common setting, the CPU is further configured to:
update a memory of a first setting value common to the plurality of imaging modes based on a first setting change operation; and
control display of a first setting operation screen common to the plurality of imaging modes regardless of a current imaging mode of the imaging apparatus,
wherein the display of the first setting operation screen is controlled based on the first setting value and an instruction on an operation of the setting item included in both the first tab and the second tab, and
in a case where the setting item of the operation target is selected as the independent setting, the CPU is further configured to:
update the memory of a second setting value of an imaging mode of the operation target based on a second setting change operation of the imaging mode of the operation target; and
control display of a second setting operation screen based on the current imaging mode and the second setting value, wherein the second setting operation screen is different from the first setting operation screen.

13. A display control method of an imaging apparatus, the display control method comprising:
controlling display of a first tab and a second tab, wherein each of the first tab and the second tab includes a setting item;
controlling display of a selection operation screen which includes a user selectable option for selection of the setting item as one of a common setting or an independent setting, wherein
the setting item is related to an imaging operation,
the common setting is commonly controlled for a plurality of imaging modes of the imaging apparatus, and
the independent setting is independently controlled for each imaging mode of the plurality of imaging modes;
controlling, in a case where the setting item is selected as the common setting, display of a first setting operation screen common to the plurality of imaging modes regardless of a current imaging mode of the imaging apparatus, wherein
the first setting operation screen is configured to execute an operation of the setting item, and
the display of the first setting operation screen is controlled based on an instruction on an operation of the setting item included in both the first tab and the second tab; and
controlling, in a case where the setting item is selected as the independent setting, display of a second setting operation screen, wherein
the display of the second setting operation screen is controlled based on the current imaging mode, and
the second setting operation screen is different from the first setting operation screen.

14. A non-transitory computer-readable medium having stored thereon computer-executable instructions, that when executed by a processor, cause the processor to execute operations, the operations comprising:
controlling display of a first tab and a second tab, wherein each of the first tab and the second tab includes a setting item;
controlling display of a selection operation screen which includes a user selectable option for selection of the setting item as one of a common setting or an independent setting, wherein
the setting item is related to an imaging operation,
the common setting is commonly controlled for a plurality of imaging modes, and
the independent setting is independently controlled for each imaging mode of the plurality of imaging modes;
controlling, in a case where the setting item is selected as the common setting, display of a first setting operation screen common to the plurality of imaging modes regardless of a current imaging mode, wherein
the first setting operation screen is configured to execute an operation of the setting item, and
the display of the first setting operation screen is controlled based on an instruction on an operation of the setting item included in both the first tab and the second tab; and
controlling, in a case where the setting item is selected as the independent setting, display of a second setting operation screen, wherein
the display of the second setting operation screen is controlled based on the current imaging mode, and
the second setting operation screen is different from the first setting operation screen.

15. An imaging apparatus, comprising:
a Central Processing Unit (CPU) configured to:
control display of a first tab and a second tab as a setting menu screen, wherein
the first tab includes a setting item corresponding to a first imaging mode of a plurality of imaging modes of the imaging apparatus, and
the second tab includes a setting item corresponding to a second imaging mode of the plurality of imaging modes;
control display of a selection operation screen which includes a user selectable option for selection of the setting item of the first tab or the second tab as one of a common setting or an independent setting, wherein
the setting item is related to an imaging operation,
the common setting is commonly controlled for the plurality of imaging modes, and
the independent setting is independently controlled for each imaging mode of the plurality of imaging modes;

control, in a case where the setting item is the common setting, display of a first setting operation screen common to the plurality of imaging modes regardless of a current imaging mode of the imaging apparatus, wherein
the first setting operation screen is configured to execute an operation of the setting item;
control display of a second setting operation screen in a case where the setting item is the independent setting, wherein
the display of the second setting operation screen is controlled based on the current imaging mode, and
the second setting operation screen is different from the first setting operation screen; and
control, in a case where the setting item is the independent setting, display of an icon to distinguish that the setting item of the first tab corresponds to the first imaging mode and the setting item of the second tab corresponds to the second imaging mode.

16. An imaging apparatus, comprising:
a Central Processing Unit (CPU) configured to:
control display of a first tab and a second tab as a setting menu screen, wherein
the first tab includes a setting item corresponding to a first imaging mode of a plurality of imaging modes of the imaging apparatus, and
the second tab includes a setting item corresponding to a second imaging mode of the plurality of imaging modes;
control display of a selection operation screen which includes a user selectable option for selection of the setting item of the first tab or the second tab as one of a common setting or an independent setting, wherein
the setting item is related to an imaging operation,
the common setting is commonly controlled for the plurality of imaging modes, and
the independent setting is independently controlled for each imaging mode of the plurality of imaging modes;
control, in a case where the setting item is the common setting, display of a first setting operation screen common to the plurality of imaging modes regardless of a current imaging mode of the imaging apparatus, wherein
the first setting operation screen is configured to execute an operation of the setting item;
control display of a second setting operation screen in a case where the setting item is the independent setting, wherein
the display of the second setting operation screen is controlled based on the current imaging mode, and
the second setting operation screen is different from the first setting operation screen; and
control, in a case where the setting item is the independent setting, display of different display modes in a first case and a second case,
in the first case, the setting item of the second tab is specified in the first imaging mode, and
in the second case, the setting item of the second tab is specified in the second imaging mode.

* * * * *